United States Patent
Engeberg et al.

(10) Patent No.: US 9,909,573 B2
(45) Date of Patent: Mar. 6, 2018

(54) THERMAL ENERGY HARVESTING SYSTEM

(71) Applicant: The University of Akron, Akron, OH (US)

(72) Inventors: Erik D. Engeberg, Cuyahoga Falls, OH (US); Subramaniya I. Hariharan, Akron, OH (US); Benjamin A. Kent, Hudson, OH (US)

(73) Assignee: The University of Akron, Akron, OH (US)

( * ) Notice: Subject to any disclaimer, the term of this patent is extended or adjusted under 35 U.S.C. 154(b) by 107 days.

(21) Appl. No.: 14/760,794

(22) PCT Filed: Jan. 15, 2014

(86) PCT No.: PCT/US2014/011678
§ 371 (c)(1),
(2) Date: Jul. 14, 2015

(87) PCT Pub. No.: WO2014/113469
PCT Pub. Date: Jul. 24, 2014

(65) Prior Publication Data
US 2015/0354548 A1 Dec. 10, 2015

Related U.S. Application Data

(60) Provisional application No. 61/752,634, filed on Jan. 15, 2013.

(51) Int. Cl.
*F03G 7/06* (2006.01)

(52) U.S. Cl.
CPC .................... *F03G 7/065* (2013.01)

(58) Field of Classification Search
CPC ................... F03G 7/065; G01K 5/68
USPC ..................................... 60/527–529
See application file for complete search history.

(56) References Cited

U.S. PATENT DOCUMENTS 5,290,023 A * 3/1994 Sasaki ............... B65H 3/48
271/104

FOREIGN PATENT DOCUMENTS

RU    2005134716 A  *  5/2007
WO    WO 9804831 A1  *  2/1998  ............. F03G 7/065

* cited by examiner

*Primary Examiner* — Mark Laurenzi
*Assistant Examiner* — Mickey France
(74) *Attorney, Agent, or Firm* — Renner, Kenner, Greive, Bobak, Taylor & Weber Co., LPA

(57) ABSTRACT

A thermal energy harvesting system includes a pair of shape memory sections formed of shape memory alloy (SMA) material that are each disposed within a tube. The shape memory sections are fixed in position at one end and are attached at another end to a rotating shaft that is in mechanical communication with a power generator. Fluid inlet valves are provided in each housing and are each controlled to alternatingly supply hot and cold fluid to the tubes to selectively heat and cool the shape memory sections. This results in the cyclical contraction and expansion of the shape memory sections, which causes oscillating rotation of the shaft that is converted by the power generator into electrical power.

7 Claims, 18 Drawing Sheets

THERMAL ENERGY HARVESTING SYSTEM

CROSS-REFERENCE TO RELATED APPLICATIONS

This application claims priority from International Application No. PCT/US2014/011678 filed Jan. 15, 2014, which claims priority from U.S. Provisional Application No. 61/752,634 filed on Jan. 15, 2013, whereby the content of each application is incorporated herein by reference.

TECHNICAL FIELD

Generally, the present invention relates to energy generation systems. In particular, the present invention is directed to a thermal energy harvesting system. More particularly, the present invention relates to a thermal energy harvesting system that generates energy by alternatingly subjecting sections of shape memory alloy (SMA) to hot and cold temperatures.

BACKGROUND OF THE INVENTION

Current energy generation systems are configured to generate power from non-renewable natural resources, such as oil and natural gas. The recovery and processing of such non-renewable natural resources requires substantial efforts and cost. In addition, energy generation systems that utilize on such natural resources to generate electricity, typically output unwanted pollutants as byproducts, which contribute to the generation of ozone damaging greenhouse gases. Furthermore, such energy generation systems are generally constructed as large systems that have a substantial number of moving parts, which require continual maintenance and upkeep to ensure that they operate at their optimal level of efficiency.

In addition, while alternative methods of energy generation have been explored, such as fracking, wind turbines, solar panels, and nuclear plants, such methods suffer from various drawbacks. Moreover, such alternative energy generation methods are unable to recover wasted thermal energy or heat that is often a substantially byproduct of many energy generation systems. For example, it has been estimated that nearly 15 terawatts of energy are lost annually as waste heat, with 90% of such waste heat being considered low-grade (i.e. <200° C.). Unfortunately, traditional waste heat recovery techniques are unable to convert such low-grade heat into electricity.

Therefore, there is a need for a thermal energy harvesting system that generates energy without unwanted pollution in accordance with the concepts of the present invention. In addition, there is a need for a thermal energy harvesting system that is compact in size. Furthermore, there is a need for a thermal energy harvesting system that converts heat into electricity. Still yet there is a need for a thermal energy harvesting system that is able to convert low temperature heat (i.e. low-grade heat), which would otherwise be lost as waste into the environment, into electricity.

SUMMARY OF THE INVENTION

In light of the foregoing, it is a first aspect of the present invention to provide a thermal energy harvesting system comprising a frame to rotatably carry a shaft adapted to be coupled to a power generator; a first elongated tube having a first shape memory section at least partially enclosed therein, the first shape memory section having one end attached to the shaft and a second end adapted to be attached to a fixed point; a second elongated tube having a second shape memory section at least partially enclosed therein, the second shape memory section having one end attached to the shaft and a second end adapted to be attached to a fixed point; a first inlet valve in fluid communication with the first tube to control the flow of hot and cold fluid into the first tube; a second inlet valve in fluid communication with the second tube to control the flow of hot and cold fluid into the second tube; and a controller coupled to the first and second inlet valves to control the flow of fluid from the first and second inlet valves; wherein when the first tube is filled with hot fluid and the second tube is filled with cold fluid, the first shape memory section contracts lengthwise and the second shape memory section expands lengthwise to rotate the shaft in a first direction, and when the first tube is filled with cold fluid and the second tube is filled with hot fluid, the first shape memory section expands lengthwise and the second shape memory section contracts lengthwise to rotate the shaft in an opposite direction, whereupon the power generator converts the rotation of the shaft into electrical power.

It is another aspect of the present invention to provide a thermal energy harvesting system comprising a frame to carry a rotating drive wheel, the drive wheel adapted to be coupled to a power generator; a first elongated tube fluidly coupled at one end to a first inlet valve and having a closed second end, the first tube at least partially enclosing a first shape memory section having a first end and a second end, the first end of the first memory shape section being attached to the second end of the first tube; a second elongated tube fluidly coupled to a second inlet valve and having a closed second end, the second tube at least partially enclosing a first shape memory section having a first end and a second end, the first end of the second memory shape section being attached to the second end of the second tube; a first drive arm slideably received within a portion of the first tube, the first drive arm in mechanical communication with the drive wheel and attached to the second end of the first shape memory section; a second drive arm slideably received within a portion the second tube, the first drive arm in mechanical communication with the drive wheel and attached to the second end of the second shape memory section; a first control valve linkage assembly in operative communication with the first inlet valve and the first drive arm, whereby movement of the first drive arm controls the flow of hot and cold fluid into the first tube by the first inlet valve; and a second control valve linkage assembly in operative communication with the second inlet valve and the second drive arm, whereby movement of the first drive arm controls the flow of hot and cold fluid into the second tube by the second inlet valve; wherein when the first tube is filled with hot fluid and the second tube is filled with cold fluid, the second shape memory section expands lengthwise and the first shape memory section contracts lengthwise to pull the first drive arm and to rotate the drive wheel in a first direction, and when the first tube is filled with cold fluid and the second tube is filled with hot fluid, the first shape memory section expands lengthwise and the second shape memory section contracts lengthwise to pull the second drive arm to rotate the drive wheel in an opposite direction, whereupon the power generator converts the rotation of the drive wheel into electrical power.

Yet another aspect of the present invention is to provide a thermal energy harvesting system comprising a first housing and a second housing, the first and second housings configured to carry a rotating shaft having a first end and a second end, the shaft adapted to be coupled to a power generator; a first support assembly disposed in the first housing and attached proximate to the first end of the shaft; a second support assembly disposed in the second housing and attached proximate to the second end of the shaft; a first shape memory section carried by the first support assembly, the first shape memory section having a first end adapted to be attached to a fixed point, and a second end attached to the first support assembly; a second shape memory section carried by the second support assembly, the second shape memory section having a first end adapted to be attached to a fixed point, and a second end attached to the second support assembly; a first inlet valve in fluid communication with the first housing to control the flow of hot and cold fluid into the first housing; a second inlet valve in fluid communication with the second housing to control the flow of hot and cold fluid into the second housing; and a controller coupled to the first and second inlet valves to control the flow of fluid from the first and second inlet valves; wherein when the first housing is filled with hot fluid and the second housing is filled with cold fluid, the first shape memory section contracts lengthwise and the second shape memory section expands lengthwise to rotate the shaft in a first direction, and when the first housing is filled with cold fluid and the second housing is filled with hot fluid, the first shape memory section expands lengthwise and the second shape memory section contracts lengthwise to rotate the shaft in an opposite direction, whereupon the power generator converts the rotation of the shaft into electrical power.

It is a further aspect of the present invention to provide a thermal energy harvesting system comprising a first support assembly having a base section with a first aperture disposed therethrough, the aperture configured to rotatably receive a shaft therethrough, the base section including a first plurality of protrusions extending therefrom, the first plurality of protrusions supporting a first shape memory section in a helical orientation, wherein a first end of the first shape memory section is attached to one of the first plurality of protrusions and a second end of the first shape memory section is attached to the shaft, the shaft being adapted to be coupled to a power generator; a second support assembly having a base section with a second aperture disposed therethrough, the aperture configured to rotatably receive the shaft therethrough, the base section including a second plurality of protrusions extending therefrom, the second plurality of protrusions supporting a second shape memory section in a helical orientation, wherein a first end of the second shape memory section is attached to one of the first plurality of protrusions and a second end of the first shape memory section is attached to the shaft; a first inlet valve in fluid communication with the first support assembly to control the flow of hot and cold fluid thereto; a second inlet valve in fluid communication with the second support assembly to control the flow of hot and cold fluid thereto; and a controller coupled to the first and second inlet valves to control the flow of fluid from the first and second inlet valves; wherein when the first shape memory section is heated with hot fluid and the second shape memory section is cooled with cold fluid, the first shape memory section contracts lengthwise and the second shape memory section expands lengthwise to rotate the shaft in a first direction, and when the first shape memory section is cooled with cold fluid and the second shape memory section is heated with hot fluid, the first shape memory section expands lengthwise and the second shape memory section contracts lengthwise to rotate the shaft in an opposite direction, whereupon the power generator converts the rotation of the shaft into electrical power.

BRIEF DESCRIPTION OF THE DRAWINGS

These and other features and advantages of the present invention will become better understood with regard to the following description, appended claims, and accompanying drawings wherein:

DETAILED DESCRIPTION OF THE INVENTION

A thermal energy harvesting system is generally referred to by numeral 10, as shown in FIGS. 1-4 of the drawings.

Figure 1:
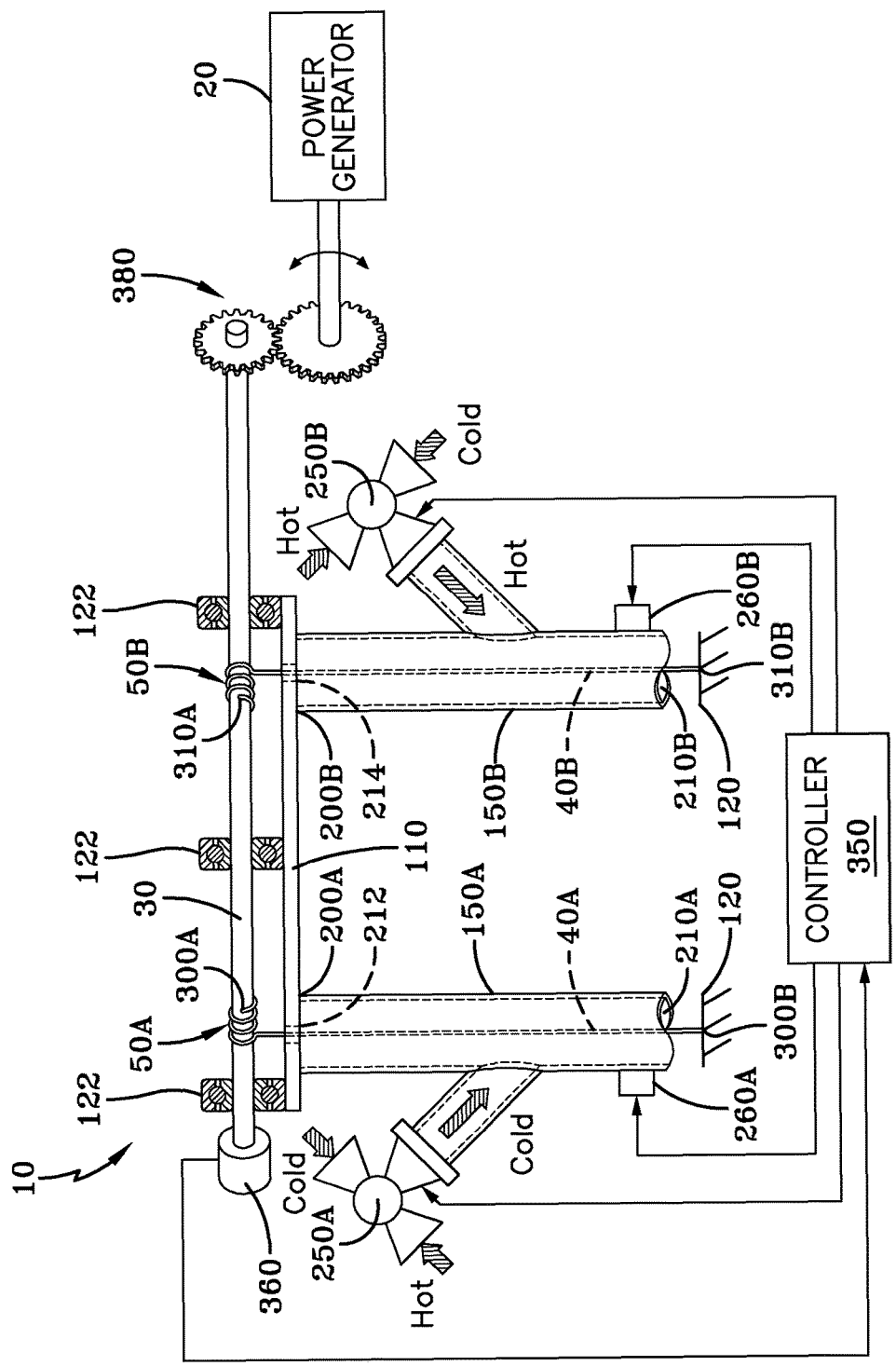
FIG. 1 is a schematic view of a thermal energy harvesting system that utilizes a pair of shape memory sections to drive a power generator in accordance with the concepts of the present invention.
Figure 2:
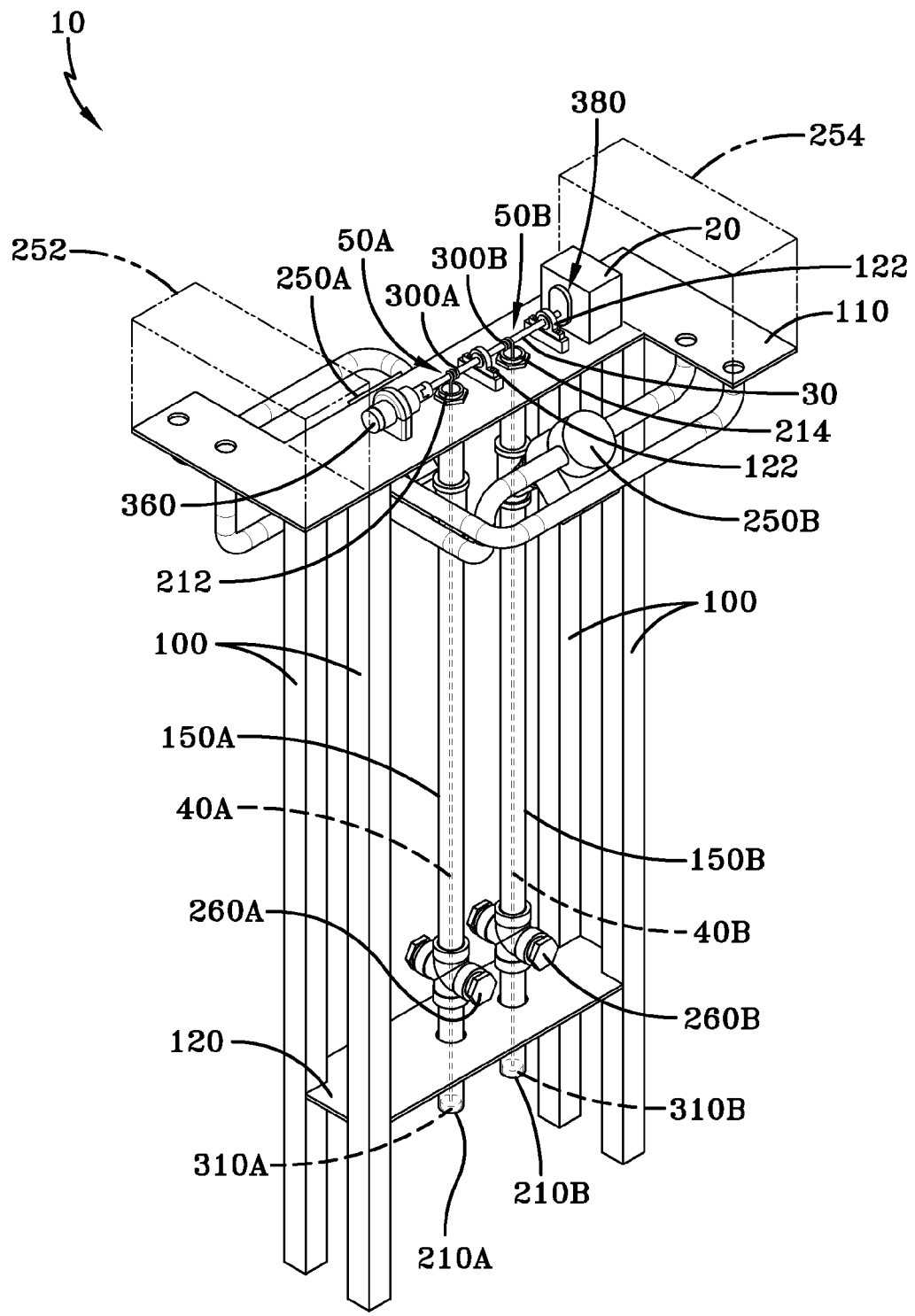
FIG. 2 is a perspective view of the thermal energy harvesting system shown in FIG. 1 in accordance with the concepts of the present invention.
Figure 3:
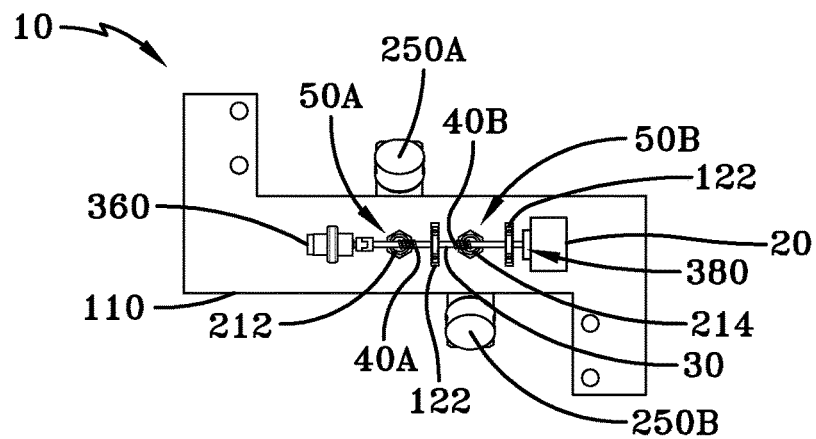
FIG. 3 is a top plan view of the thermal energy harvesting system in accordance with the concepts of the present invention.
Figure 4:
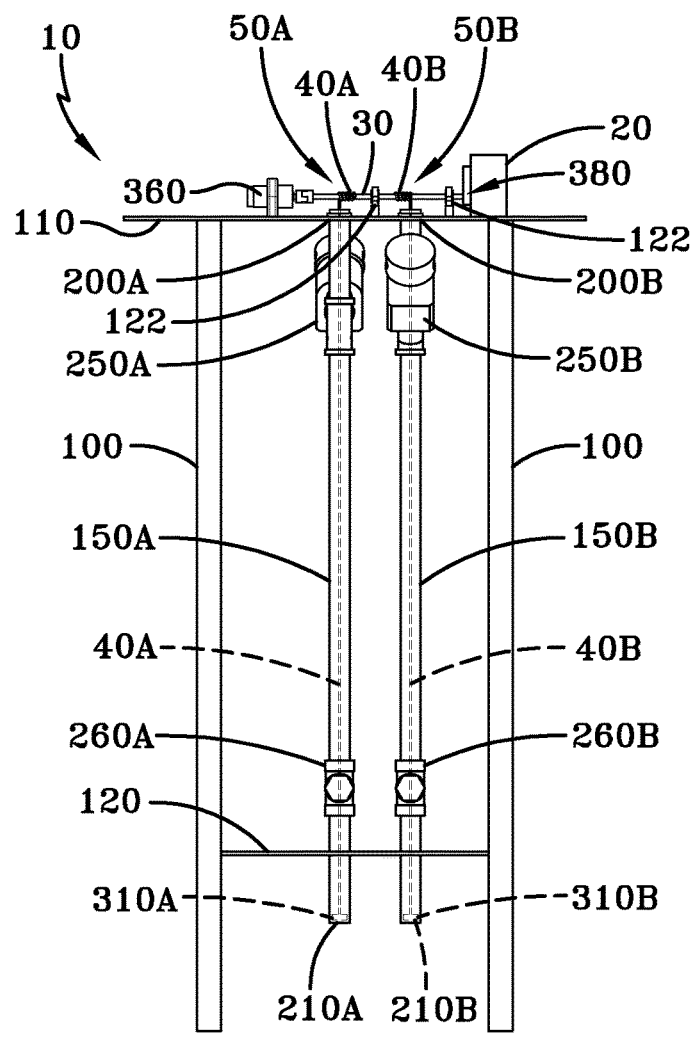
FIG. 4 is a front elevational view of thermal energy harvesting system in accordance with the concepts of the present invention.

The thermal energy harvesting system 10 includes a power generator 20 that is configured to generate electrical power or energy when a shaft 30 that is in mechanical communication with the generator 20 is rotated in either direction (e.g. clockwise or counterclockwise). Coupled to the shaft 30 is a first shape memory section 40A and a second shape memory section 40B, as shown clearly in FIGS. 1 and 2. For the purposes of the following discussion, the shape memory sections 40A-B are formed from any elongated section of shape memory material, shape memory alloy (SMA), or any other material that is capable of taking on one shape (e.g. expanded in length) when cooled and another shape (e.g. contracted in length) when heated. Continuing, one end of each of the shape memory sections 40A-B includes respective pre-shaped coil sections 50A-B, which may take on a coiled or helical shape. As such, the coil sections 50A-B are each wound around the shaft 30 at spaced apart locations, while the other end of each shape memory sections 40A-B is attached to a static or fixed position, as shown in FIGS. 1 and 2. As such, when the shape memory sections 40A-B are heated, they contract so that the pre-shaped coil sections 50A-B are straightened, whereas when the shape memory sections 40A-B are cooled, they expand so that the pre-shaped coil sections 50A-B are able to return to their fully coiled state. As such, the system 10 subjects the shape memory sections 40A-B to alternating cycles of hot and cold temperatures, such as that provided by any suitable hot and cold fluid, such as water, to control the alternating expansion and contraction of the shape memory sections 40A and 40B. Accordingly, during a first cycle, the shape memory section 40A is cooled, while the shape memory section 40B is heated, which results in the rotation of the shaft 30 in one direction. In a second cycle, the shape memory section 40A is heated, while the shape memory section 40B is cooled, which results in the rotation of the shaft 30 in the opposite direction. As a result of the mechanical energy imparted through the rotation of the shaft 30, the power generator 20 is able to generate electrical energy.

In particular, the energy harvesting system 10 includes a frame structure 100 that provides support to several components to be discussed. In one aspect, the frame 100 includes an upper section 110 and a spaced lower section 120. Specifically, the lower section 120 is configured to be set upon or near the ground or floor, while the upper section 110 serves as a base that supports several of the components of the system 10 to be discussed. Specifically, the frame 100 is configured to carry the generator 20, and is configured to rotatably support or carry the shaft 30 that is in operative mechanical communication with the generator 20 via bearings 122 or the like.

The thermal energy harvesting system 10 also includes a pair of elongated tubes 150A and 150B that are each carried by the frame 100. In one aspect, the first and second tubes 150A-B may be configured to be annular in shape, however they may be configured to have any desired cross-sectional shape. The tubes 150A-B may be oriented in a substantially vertical manner relative to the surface upon which the frame 100 is rested; however, the tubes 150A-B may be positioned in any desired orientation. The tubes 150A-B each has respective upper ends 200A-B and opposed respective lower ends 210A-B. As such, each of the upper ends 200A-B of the tubes 150A-B are positioned adjacent to respective apertures 214 that are disposed in the upper section 110 of the frame 100.

Positioned proximate to the upper end 200A of the first tube 150A and proximate to the upper end 200B of the second tube 150B are respective fluid inlet valves 250A and 250B. The fluid inlet valves 250A-B comprise electromechanical valves that are controlled in accordance with commands that are communicated from a microprocessor or other controller to be discussed in detail below. The fluid inlet valves 250A-B are each in fluid communication with both a hot fluid source 252 and a cold fluid source 254, as shown in FIG. 2. It should be appreciated that the hot and cold fluid utilized by the system 10 may comprise any suitable fluid, such as water or oil for example. As such, the fluid inlet valves 250A-B operate so that an alternating or periodic flow of hot and cold fluid is delivered from the hot and cold fluid sources 252 and 254 into the tubes 150A-B. Furthermore, disposed at or proximate to the lower ends 210A-B of the tubes 150A-B are respective drain valves 260A-B that are configured to selectively drain fluid that has accumulated within the tubes 150A-B. It should also be appreciated that the drain valves 260A-B comprise electromechanical valves that are controlled by a controller to be discussed.

Disposed within the tubes 150A-B are respective shape memory sections 40A-B, as shown in FIG. 1, which comprise elongated sections of shape memory material that expands in length when cooled and contracts in length when heated. It should be appreciated that the shape memory sections 40A-B may take on any suitable cross-sectional shape, such as an annular or rectangular shape for example. Specifically, the shape memory section 40A has opposed ends 300A-B, while shape memory section 40B has opposed ends 310A-B. In particular, the ends 300A and 310A of the shape memory sections 40A-B are shaped to have coils 50A-B that are configured to be wound around the shaft 30. In addition, the remaining ends 300B and 310B of the shape memory sections 40A-B are fixedly attached to the ends 210A and 210B of the tubes 150A-B. However, it should be appreciated that the ends 300B and 310B may be attached to any other fixed structures. Thus, the coils 50A-B of the shape memory sections 40A-B are spaced apart from each other and are wound around the shaft 30 in an antagonistic manner, with the ends 300A and 310A fixedly attached to the shaft 30. It should be appreciated that the top end 200A-B of the tubes 150A-B from which the top ends 300A and 310A of the shape memory sections 40A-B extend may be sealed using any known technique, such as a gasket, to prevent the fluid within the tubes 150A-B from leaking around the shape memory sections 40A-B therefrom. Thus, the coils 50A-B allow the shape memory sections 40A-B to expand and contract in length during the operation of the energy harvesting device 10, which enables the rotation of the shaft 30 in a manner to be discussed.

The energy harvesting system 10 also includes a controller 350, as shown in FIG. 1, that provides the necessary hardware and software required to carryout the various functions to be discussed. The controller 350 is coupled to the fluid inlet valves 250A-B to control the flow of hot and cold fluid supplied from the hot fluid source 252 and the cold fluid source 254 into the tubes 150A-B. It should be appreciated that the hot fluid source 252 may comprise any suitable source of hot fluid, such as a hot water tank for example, while the cold fluid source 254 may comprise any suitable source of cold fluid, such as a refrigerated water tank, or natural water source, such as a stream, for example. In one aspect, the fluid may be heated using any suitable low-grade heat source. The controller 350 is also coupled to drain valves 260A-B, which drains the tubes 150A-B of any fluid as necessary. In addition, the controller 350 is coupled to a potentiometer 360 that is in operative mechanical communication with the shaft 30, allowing the potentiometer 360 to monitor the amount of rotation that the shaft 30 undergoes during the operation of the energy harvesting system 30. Thus, the amount of rotation experienced by the shaft 30, as detected by the potentiometer 360, allows the controller 350 to control the fluid inlet valves 250A-B and drain valves 260A-B in accordance with a control sequence or protocol to be discussed in detail below, so that when one of the tubes 150A-B is filled with hot fluid, and the other tube 150A-B is filled with cold fluid.

It should be appreciated that the shaft 30 is rotatably carried by the frame 100 and is in operative mechanical communication with the power generator 20. In one aspect, the shaft 30 may be mechanically interfaced with the generator 20 using a sequence of gears 380, as shown in FIG. 2. Furthermore, the power generator 20 may comprise any suitable device that is configured to convert the mechanical rotational force generated by the rotating shaft 30 into electrical power. It should also be appreciated that the power generator 20 may be configured to output AC (alternating-current) power, or may be configured so that it generates DC (direct current) power using known techniques.

With the structural components of the thermal energy harvesting system 10 set forth, the following discussion will present the steps taken by the system 10 when it is placed into operation. Initially, during a first cycle, the controller 350 actuates the fluid inlet valve 250A to allow cold fluid to enter into the tube 150A. This results in the cooling of the shape memory section 40A and its lengthwise expansion, such that the coil section 50A is in a fully coiled sate. Somewhat simultaneously, the controller 350 also actuates the fluid inlet valve 250B to allow hot fluid to enter into the tube 150B. This results in the heating of the shape memory section 40B and its lengthwise contraction, resulting in the un-coiling of the coil section 50B. As a result of the lengthwise expansion of shape memory section 40A and the lengthwise contraction of shape memory section 40B, the shaft 30 is rotated in a first direction, as detected by the potentiometer 360, and thereby mechanically driving the power generator 20 to generate electrical power.

Upon the detection by the controller 350 that the shaft 30 has rotated to its fullest extent, the controller 350 purges or drains the tubes 150A-B of the existing fluid via the drain valves 260A-B. Once the tubes 150A-B are purged of the fluid, the controller 350 enters a second cycle, and controls the fluid inlet valve 250B so that cold fluid is delivered into the tube 150B. This cools the shape memory section 40B causing its lengthwise expansion, such that the coil section 50B is in a fully coiled state. Somewhat simultaneously, the controller 350 also actuates the fluid inlet valve 250A to allow hot fluid to enter into the tube 150A. This results in the heating of the shape memory section 40A and its lengthwise contraction, resulting in the un-coiling of the coil section 50A. As a result of the lengthwise expansion of shape memory section 40B and the lengthwise contraction of shape memory section 40A, the shaft 30 is rotated in a second direction, opposite to that of the first direction, as detected by the potentiometer 360, thereby mechanically driving the power generator 20, which generates electrical power. Upon the detection by the controller 350 that the shaft 30 has rotated to its fullest extent, the controller 350 controls the drain valves 260A-B to purge the tubes 150A-B of existing fluid.

The energy harvesting system 10 continues this process, alternating between the first and second cycles to oscillate the shaft 30 back and forth in alternating directions, whereupon the rotational movement of the shaft 30 is converted by the generator 30 into electrical energy.

Figure 5:
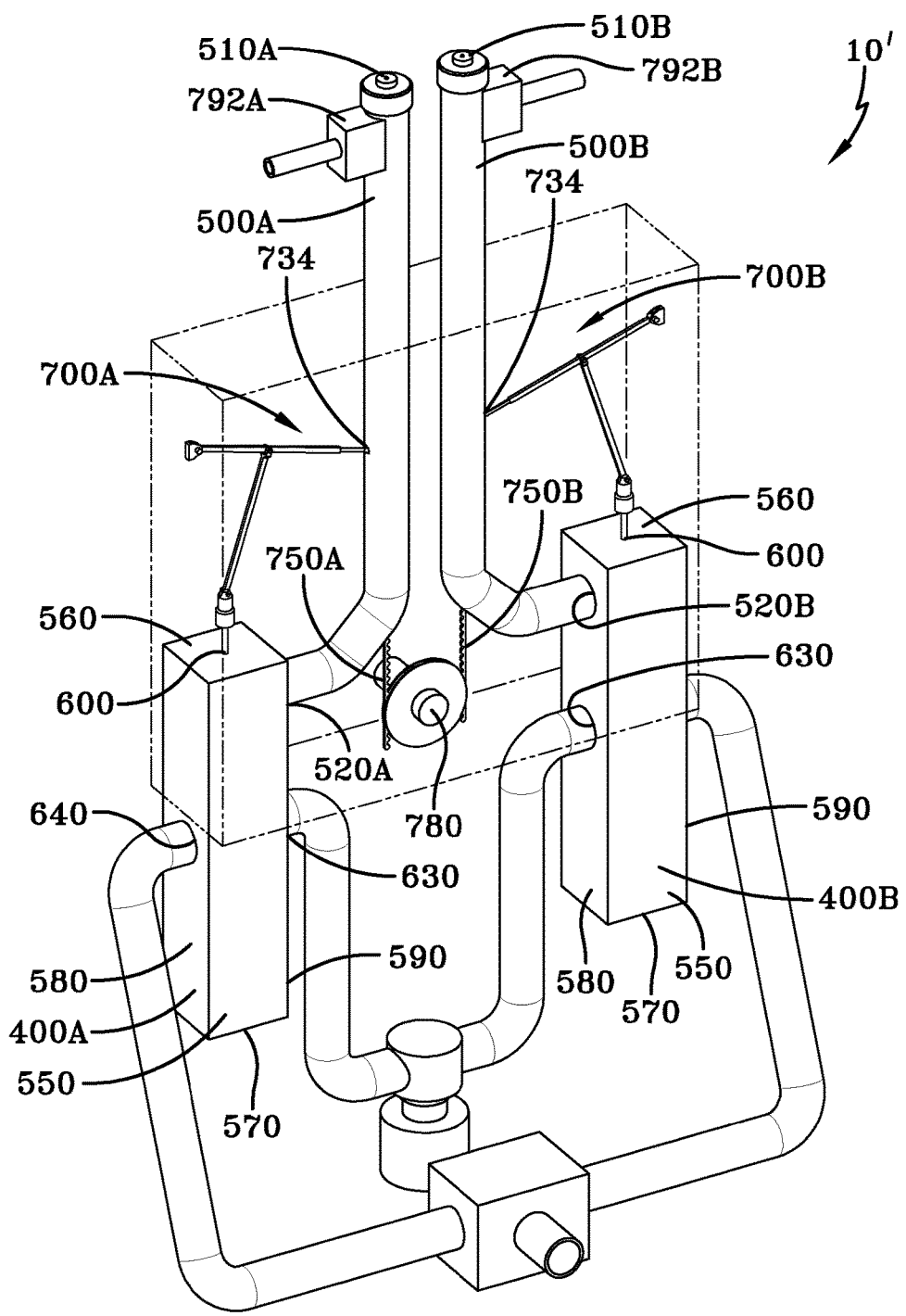
FIG. 5 is a perspective view of an alternative thermal energy harvesting system utilizing mechanical inlet valves in accordance with the concepts of the present invention.
Figure 6:
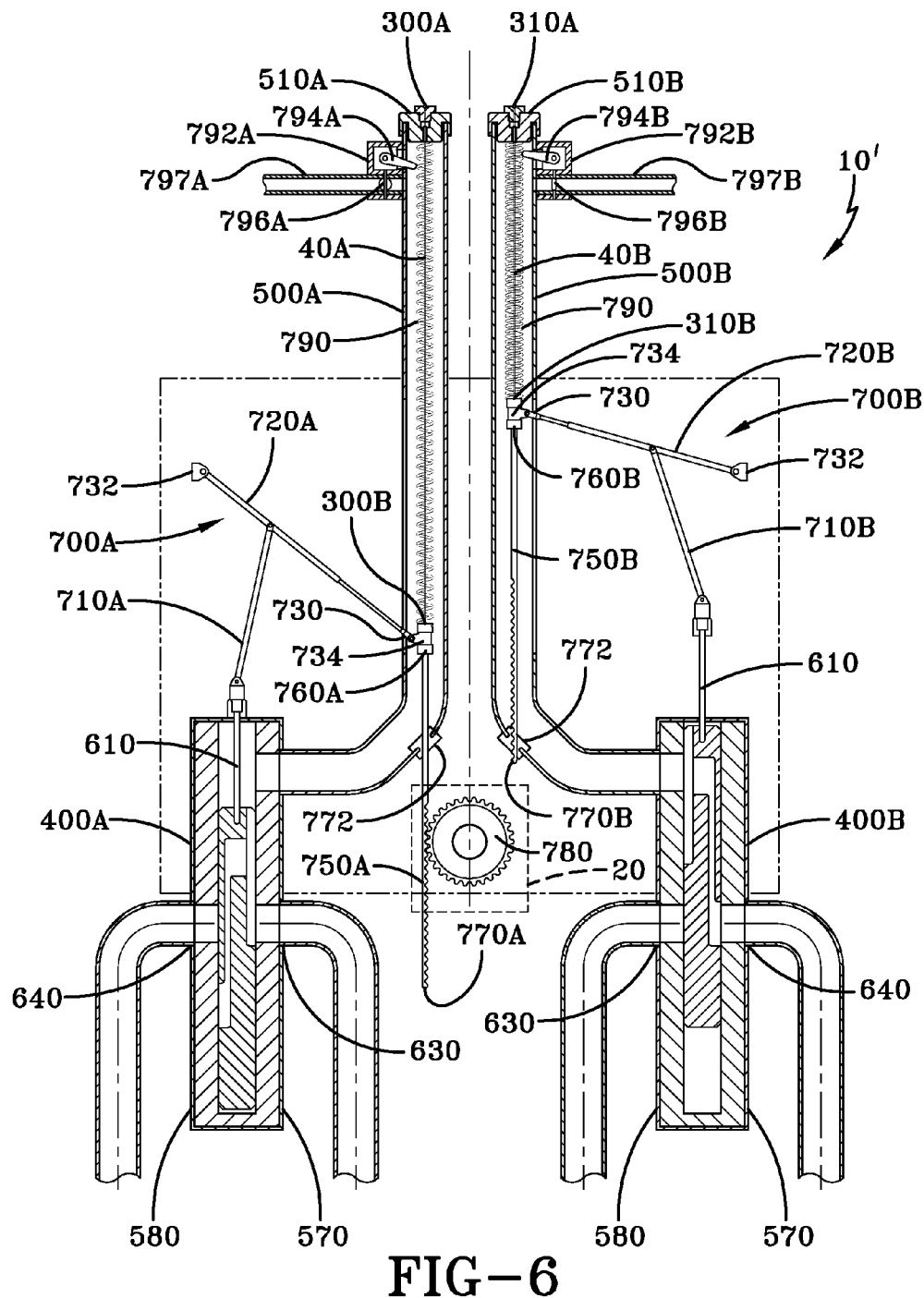
FIG. 6 is a cross-sectional view of the alternative thermal energy harvesting system in accordance with the concepts of the present invention.

Another embodiment of the thermal energy harvesting system, referred to by reference numeral 10', is shown in FIGS. 5-7 of the drawings. In this embodiment, the electromechanical fluid inlet valves 250A-B of system 10 have been replaced with mechanical fluid inlet valves 400A-B, which utilizes the movement of the shape memory sections 40A-B to control their state and the flow of hot and cold fluid in and out of the system 10'. As such, the energy harvesting system 10' includes tubes 500A and 500B that have respective upper ends 510A-B and respective lower ends 520A-B. The lower ends 520A-B of the tubes 500A-B are in fluid communication with respective mechanical valves 400A-B, while the upper ends 510A-B of the tubes are closed or sealed off or shut with a cap or the like. It should be appreciated that the tubes 500A-B may take on any desired cross-sectional shape, such as an annular shape. The fluid inlet valves 400A-B include a body 550 having an opposed top surface 560 and bottom surfaces 570, and opposed lateral surfaces 580 and 590. In particular, an actuation aperture 600 is disposed in the top surface 560 of the body 550, which allows the reciprocating, up and down movement of a control valve plunger 610 includes a plurality of parts that is disposed within the valve body 550. In addition, each of the valves 400A-B include a hot fluid inlet 630 and a cold fluid inlet 640, such that the hot fluid inlet 630 and the cold fluid inlet 640 are disposed in respective lateral surfaces 590 and 580 of the fluid inlet valve 400A, and the hot fluid inlet 630 and the cold fluid inlet 640 are disposed in respective lateral surfaces 580 and 590 of the fluid inlet valve 400B. As such, the control valve plunger 610 includes a plurality of parts that serve to mechanically control the flow of hot and cold fluid into each of the tubes 500A-B to control the expansion and contraction of the shape memory sections 40A-B in a manner to be discussed.

To mechanically control the movement of the control valve plunger 610 of each valve 400A-B, respective control valve linkage assemblies 700A-B are utilized, as shown in FIGS. 5 and 6. The control valve linkage assemblies 700A and 700B include respective actuation arms 710A-B and respective control arms 720A-B. The actuation arms 710A-B are each pivotably attached at one end to the top of respective control valve plungers 610A-B and are each pivotably attached at another end to respective control arms 720A-B. The control arms 720A-B each have opposed ends 730 and 732, such that a plunger 734 is pivotably attached to the end 730 of each control arm 720A-B. In particular, the end 730 of each control arm 720A-B is disposed through apertures 734 provided in each of the tubes 500A-B. It should be appreciated that apertures 734 are configured to provide a sealed interface with the tubes 500A-B to the movement of the control arms 720A-B so that fluid is not permitted to leak therefrom. The plunger 734 is disposed within respective tubes 500A-B and is in mechanical communication with drive arms 750A-B that are slideably received within the tubes 500A-B. The drive arms 750A and 750B have respective top ends 760A-B and respective bottom ends 770A-B, such that the top ends 760A-B are disposed within the tubes 500A-B through corresponding apertures 772, while the bottom ends 770A-B are attached or otherwise mechanically engaged with a rotating drive wheel 780. It should be appreciated that apertures 772 are configured to provide a sealed interface with the tubes 500A-B and the movement of the drive arms 750A-B so that fluid is not permitted to leak therefrom. That is, the bottom ends 770A-B of the drive arms 750A-B are mechanically coupled to the rotating drive wheel 780, via any suitable coupling means, such as a geared connection shown in the FIG. 6, such that when the wheel 780 rotates, one of the drive arms 750A-B moves in one direction, while the other pivot rod moves in an opposite direction. The rotating drive wheel 780 is rotatably carried by a housing or other structure and is rotatably coupled to the power generator 20 by a shaft or other suitable means.

In addition, the shape memory sections 40A-B are disposed within respective tubes 500A-B, such that the end 300A and 310A of each of the shape memory sections 40A-B is attached at respective ends 510B-510B of the respective tubes 500A-B while the other end 300B and 310B of each of the shape memory sections 40A-B is attached to respective ends 760A-B of the drive arms 750A-B. In addition, springs 790 are disposed within each of the tubes 500A-B between the plunger 734 and the ends 510A-B of the tubes 500A-B to maintain tension (i.e. bias) on the control valve linkage assemblies 700A-B, to facilitate the operation of the thermal energy harvesting system 10'.

Figure 7A:
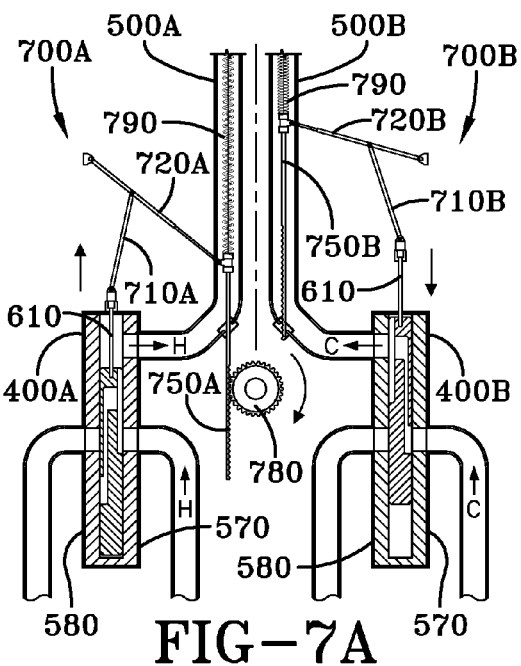
FIGS. 7A-H are cross-sectional views of the alternative thermal energy harvesting system in accordance with the concepts of the present invention.
Figure 7B:
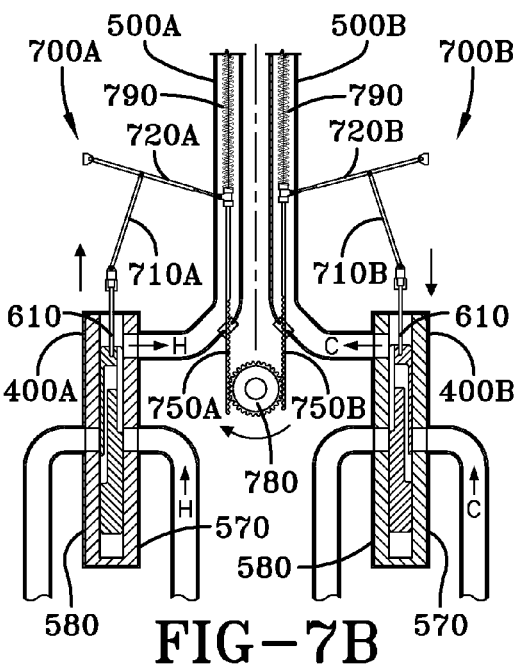
Figure 7C:
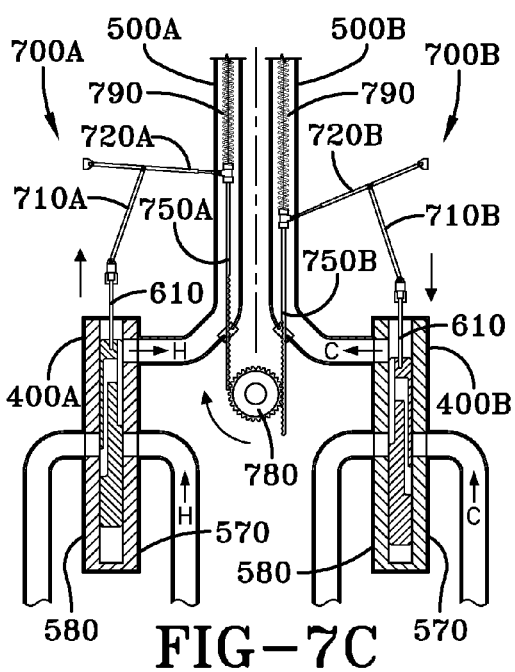
Figure 7D:
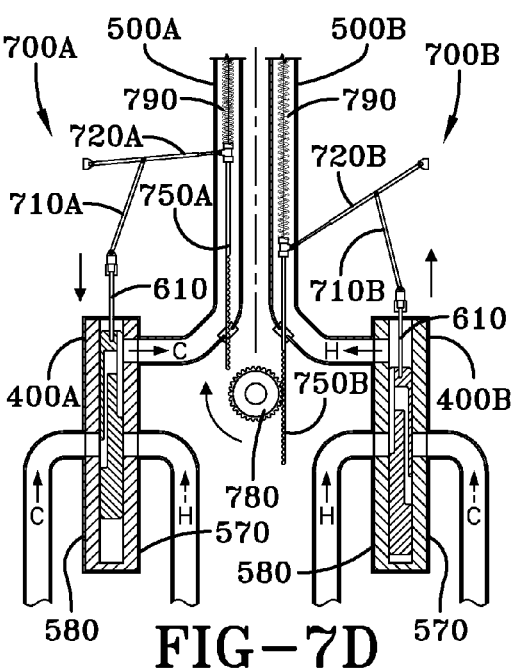
Figure 7E:
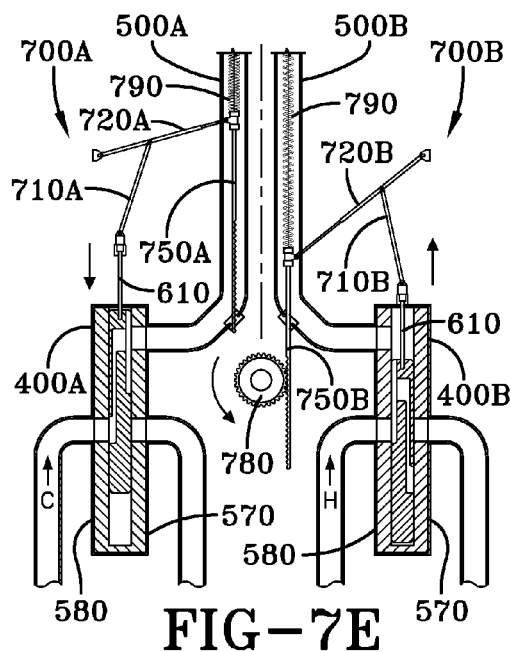
Figure 7F:
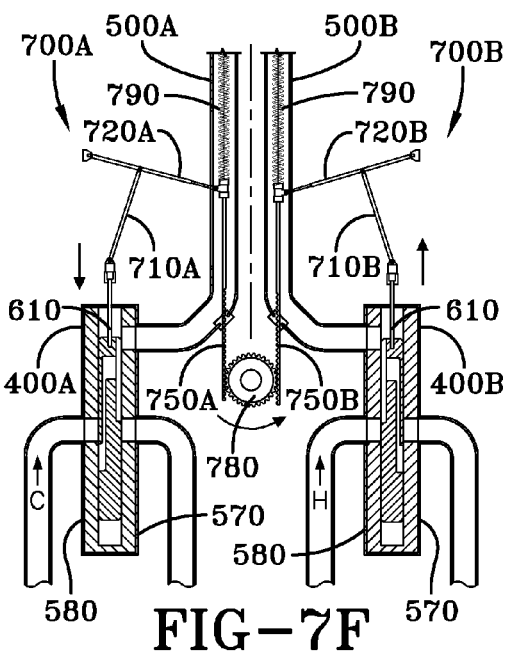
Figure 7G:
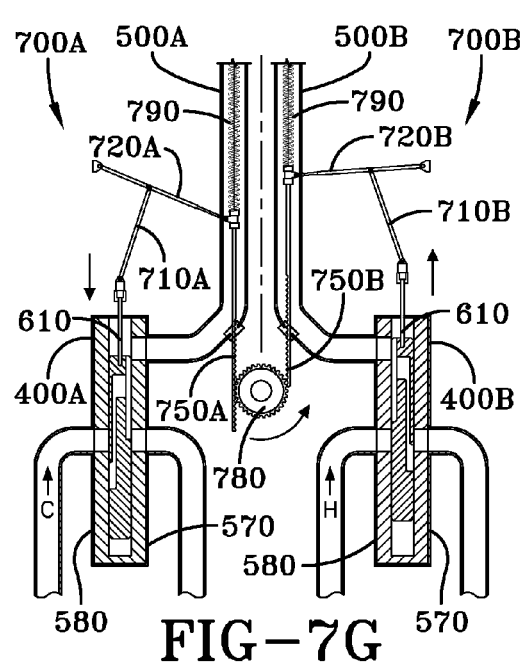
Figure 7H:
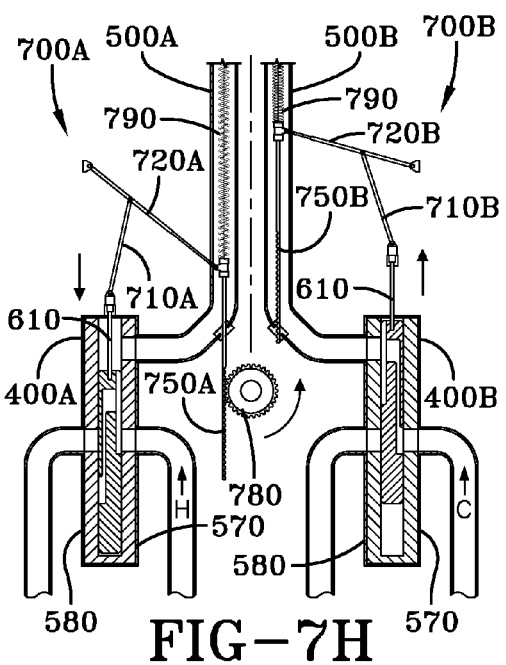
Figure 8:
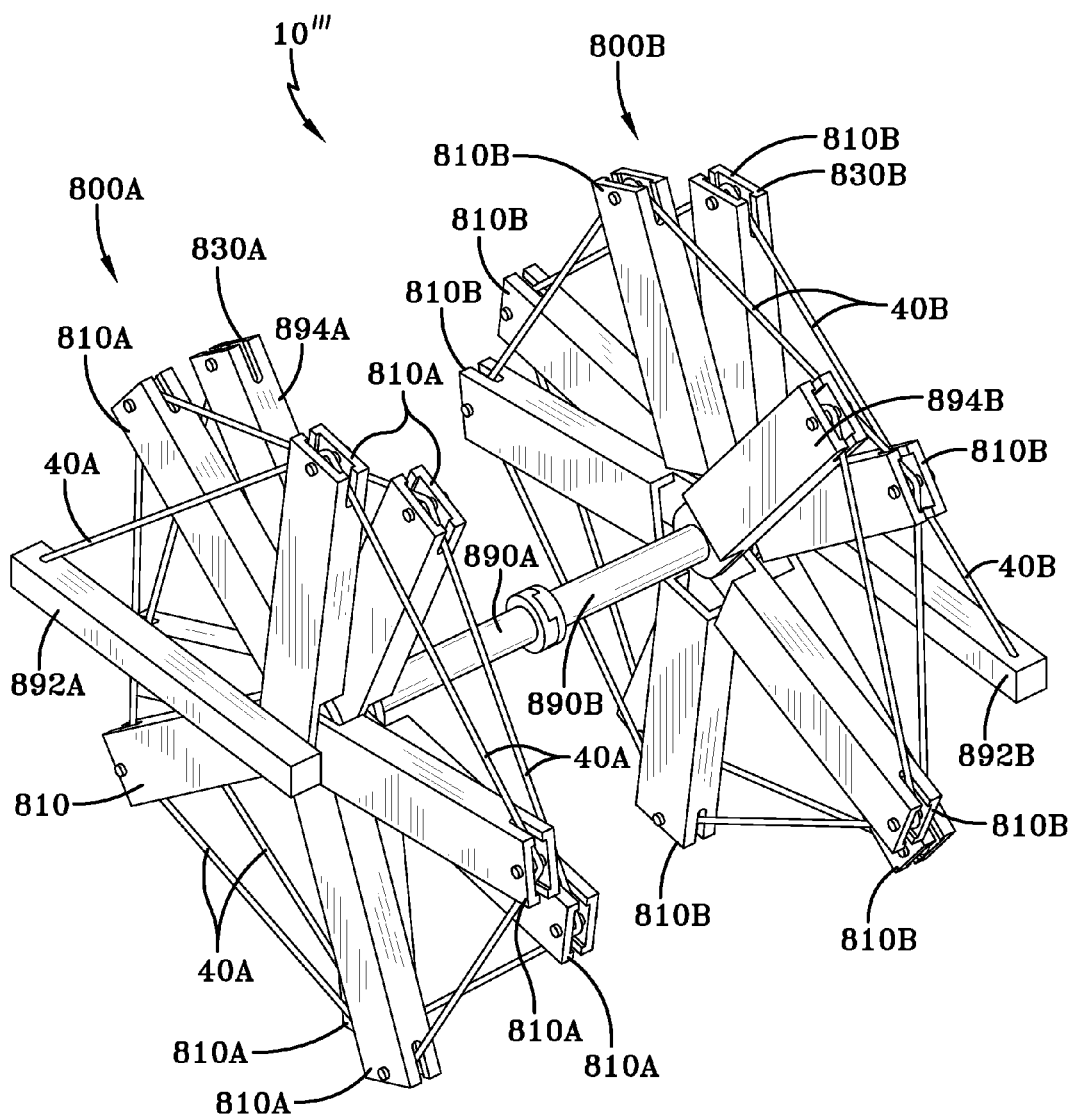
FIG. 8 is a perspective view of another alternative embodiment of the thermal energy harvesting system in accordance with the concepts of the present invention.

Thus, during operation of the energy harvesting system 10', the valve 400A allows hot fluid to enter tube 500A, while the valve 400B allows cold water to enter tube 500B, as shown in FIG. 7A. This causes the shape memory section 40A to contract in length and the shape memory section 40B to expand in length. As a result, the drive arm 750A is pulled upward, rotating the drive wheel 780 in a clockwise direction, while the drive arm 760 is pulled downward, as shown in FIGS. 7B-C. As such, the mechanical rotation of the drive wheel 780 drives the generator 20. As such, once the drive arm 750A is pulled upward and the drive arm 750B is pulled downward to a predetermined point, as shown in FIG. 7D, the valve plunger 610 of the valve 400A begins to shut off the flow of hot fluid entering the tube 500A, while the valve 400A permits the flow of cold fluid into the tube 500A. In addition, a drain valve 792A, shown in FIG. 6, is actuated by the compressive force of the spring 790 in tube 500A to allow the cold fluid to displace the hot fluid in tube 500A. Simultaneously with this, the valve plunger 610 of valve 400B begins to shut off the flow of cold fluid entering the tube 500B, and enables the flow of hot fluid into the tube 500B, also shown in FIG. 7D. In addition, a drain valve 792B is actuated by the expansion of the spring 790 in the tube 500B to allow the hot fluid to displace the cold fluid in tube 500B. Once the hot fluid within the tube 500A has been replaced with cold fluid, and the cold fluid has been replaced with hot fluid in tube 500B, the shape memory section 40A is permitted to expand in length, while the shape memory section 40B contracts in length, thereby pulling the drive arm 750B upward, as shown in FIGS. 7E-G and rotating the wheel 780 of the energy harvesting system 10' in the counter-clockwise direction. Accordingly, the drive arm 750A is pulled downward due to the rotation of the wheel 780. As such, as the drive arm 750B is pulled upward and the drive arm 750A is pulled downward to a predetermined point, whereupon the valve plunger 610 of the valve 400A begins to shut off the flow of cold fluid entering the tube 500A and permits the flow of hot fluid into the tube 500A, as shown in FIG. 7H. In addition, the drain valve 792A is actuated by the expansion of the spring 790 in the tube 500A to allow the hot fluid to displace the cold fluid in tube 500A. Simultaneously with this, the valve plunger 610 of valve 400B begins to shut off the flow of hot fluid entering the tube 500B and enables the flow of cold fluid into the tube 500B, as shown in FIG. 7H. In addition, the drain valve 792B is actuated by the compression of the spring 790 in the tube 500B to allow the hot fluid to displace the cold fluid in tube 500B. As a result the wheel 780 is rotated in a clockwise direction, thereby driving the generator 20.

Accordingly, such sequence is continuously performed so that the oscillating rotation of the drive wheel 780 is converted by the power generator 20 into electric power.

Figure 9:
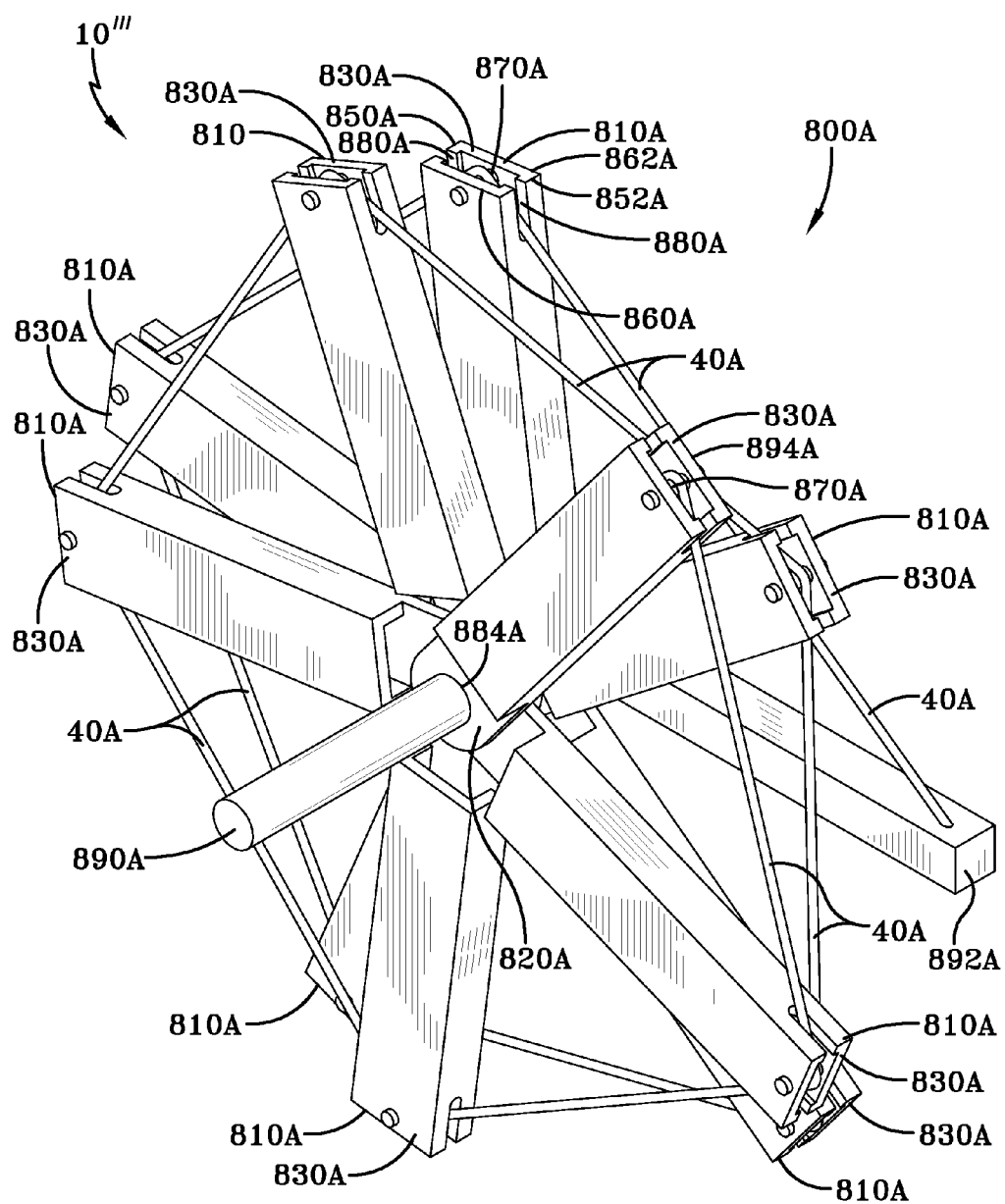
FIG. 9 is a perspective view of a support assembly of the alternative thermal energy harvesting system in accordance with the concepts of the present invention.
Figure 10:
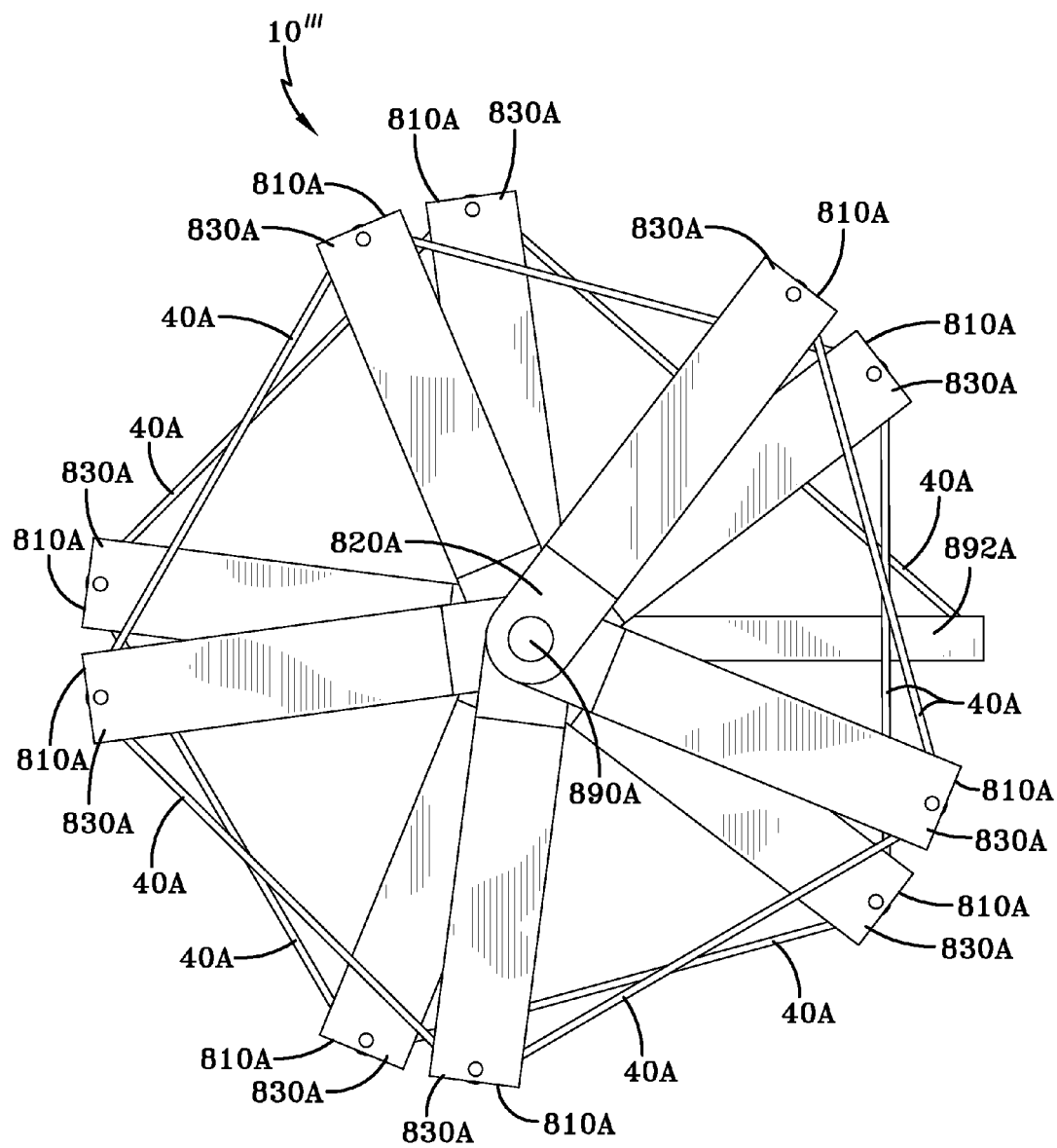
FIG. 10 is a top plan view of the support assembly of the alternative thermal energy harvesting system in accordance with the concepts of the present invention.

It should be appreciated that the drain valves 792A-B include respective levers 794A-B that are configured to detect the expansion and contraction of the springs 790 in the respective tubes 500A-B. Specifically, the levers 794A-B are mechanically coupled to respective butterfly valves 796A-B disposed in respective drain pipes 797A-B that are in fluid communication with the tubes 500A-B. Accordingly, the butterfly valves 796A-B of the drain valves 792A-B remain normally closed; however, they are actuated when the levers 794A-B detect a change in the expansion or compression of the spring 792 in the tubes 500A-B that crosses a predetermined threshold value mechanically set by the lever mechanism 794A-B. It should be appreciated that other means of draining the tubes may also be utilized, including a gravity drain or electro-mechanical drain valves controlled by a microprocessor An alternative embodiment of the thermal energy harvesting system, designated by the reference numeral 10''', is shown in FIGS. 8-11 of the drawings. The energy harvesting system 10''' includes a pair of support assemblies 800A and 800B, however because support assemblies 800A and 800B are structurally equivalent, only the components of support assembly 800A will be discussed below, such that the components associated with support assembly 800A will be identified by the identifier 'A' and the components associated with the support assembly 900B will be identified by the identifier 'B'. Specifically, the support assembly 800A provides a plurality of radially extending arms 810A that extend from a central base section 820A to an end 830A. The arms 810A may be configured to take on any cross-sectional shape, such as a rectangular shape. The ends 830A of the arms 810A are defined by spaced apart upper and lower sections 850A and 852A and spaced apart lateral sections 860A and 862A, as shown in FIG. 9. Extending between the lateral sections 860A,862A at a substantially right angle thereto is a support section 870A. In addition, disposed within each of the upper and lower sections 850A, 852A of the arms 810A are curved recesses 880A. It should also be appreciated that the position of the arms 810A are provided in in a progressively stacked configuration, such that one or more of the arms 810A are located in different planes. For example, the ends 830A of each of the arms 810A may be in a different plane from one another.

Disposed through the base section 820A is an aperture 884A that is configured to rotably receive a shaft 890A therethrough, such that the arms 810A are rotatably carried by the rotation of the shaft 890A. In addition, a fixed arm 892A that is not rotatably carried by the shaft 890A is also provided and may be mounted to a rigid non-moving structure, such as a wall. Alternatively, the shaft 890A may comprise any rigid non-moving attachment point.

The energy harvesting system 10''' also includes a shape memory section 40A that is carried by the ends 830A of the arms 810A, such that the shape memory section 40A takes on a helical or coiled configuration due to the progressively stacked arrangement of the arms 810A. In addition, it should be appreciated that the shape memory section 40A is supported by the support section 870A of the arms 810A, while passing through the recesses 880A of each arm 810A. Furthermore, one end of the shape memory section 40A is attached to the fixed, non-moving arm 892A, while the other end of the shape memory section 40A is attached to a terminal arm 894A that is affixed to the shaft 890A.

Also attached to the other end of the shaft 890 is a complementary support assembly 800B, which is structurally equivalent to support assembly 800A previously discussed. As such, the support assembly 800B is configured to support a shape memory section 40B in an equivalent manner to that discussed with respect to support assembly 800A.

Figure 11:
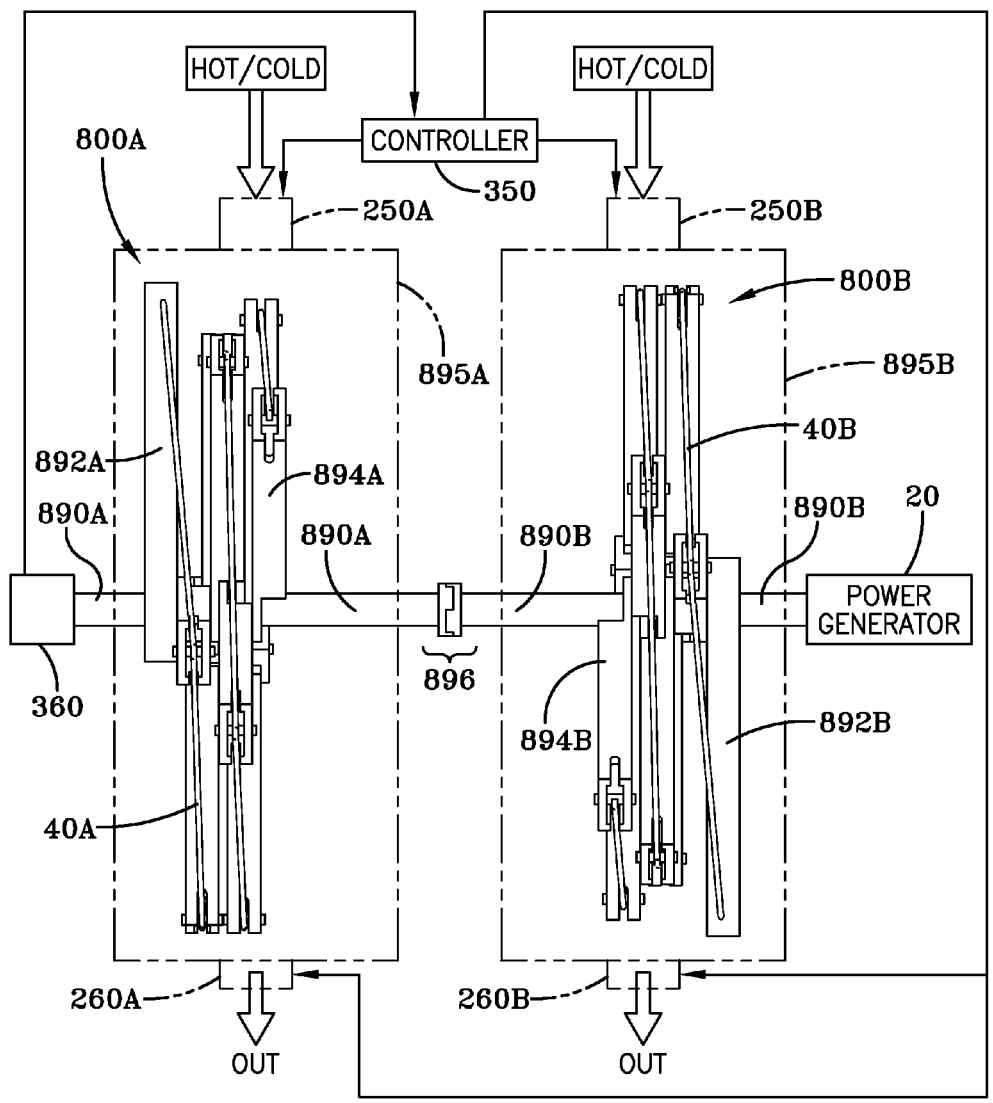
FIG. 11 is a schematic view of the alternative thermal energy harvesting system in accordance with the concepts of the present invention.
Figure 12:
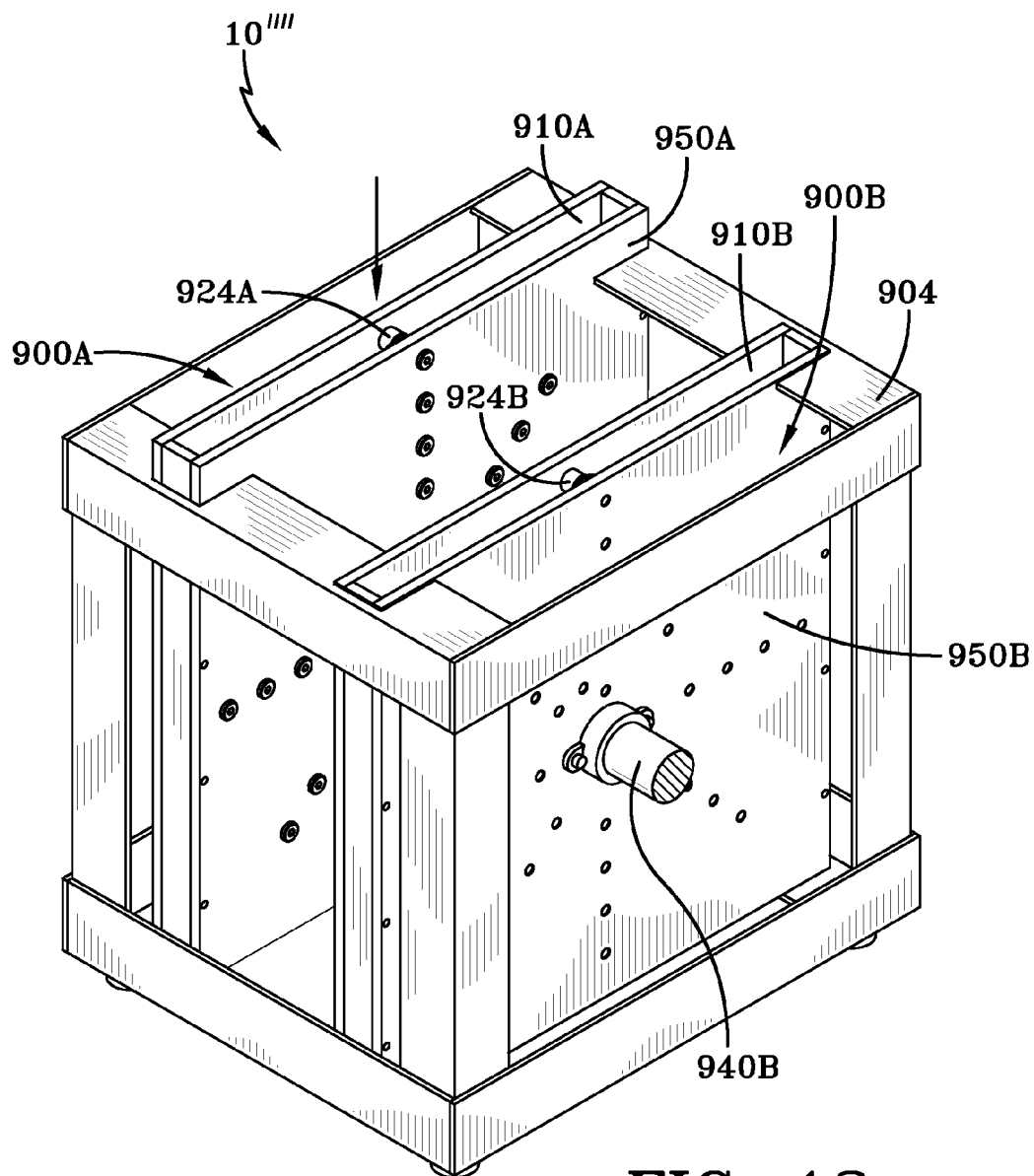
FIG. 12 is a perspective view of another embodiment of the thermal energy harvesting system in accordance with the concepts of the present invention.

Each of the support assemblies 800A and 800B are disposed in separate respective housings 895A and 895B, as shown in FIG. 11, so that the shape memory sections 40A-B can be alternately cooled and heated. Once the support assemblies 800A-B are placed within the respective housings 895A-B, the shafts 890A and 890B may be coupled together via coupling 896, however it should be appreciated that the shafts 890A-B may be replaced with a single shaft. It should be appreciated that the shafts 890A-B are supported by suitable bearings or the like by the housings 895A-B. In addition, to enable the flow of hot and cold fluid into each of the housings 895A-B, respective inlet valves 250A-B are provided at the top of each housing 895A-B, while drain valves 260A-B are provided at the bottom of each respective housing 895A-B to drain fluid therefrom. Attached to the shaft 890 at one end is the potentiometer 360, while the power generator 20 is attached to the other end of the shaft 890. Furthermore, the potentiometer 360, inlet valves 250A-B and drain valves 260A-B are coupled to the controller 350, which is configured to carry out functions equivalent to that discussed with regard to system 10'.

As such, during operation of the thermal energy harvesting system 10''', when the memory shape section 40A is cooled, the memory shape section 40B is heated, and vice versa using the fluid supplied by the valves 250A-B. Specifically, during a first cycle, the system 10''' is operated, such that the section 40A of the support assembly 800A is heated by hot fluid, while the shape memory section 40B of the support assembly 800B is cooled by cold fluid. This causes the lengthwise expansion of shape memory section 40B and the lengthwise contraction of the shape memory section 40A, which pulls the terminal arm 894A of the support assembly 800A and drives the rotation of the shaft 890A-B in one direction, which is converted by the power generator 20 into electrical energy. Next, in a second cycle where the potentiometer 360 determines the shaft 890A-B has been rotated to its fullest extent, the fluid in the housings 895A-B is drained via valves 260A-B, whereupon the shape memory section 40A of the support assembly 800A is cooled by the cold fluid, and the section 40B of the support assembly 800B is heated by hot fluid. This causes the lengthwise expansion of the shape memory section 40A and the lengthwise contraction of the shape memory section 40B, which pulls the terminal arm 894B of the support assembly 800B, and which drives the rotation of the shaft 890A-B in the opposite direction, which is converted by the power generator 20 into electrical energy. In other words, the alternating heating and cooling of the shape memory sections 40A-B creates an oscillating, or back and forth, motion at the shaft 890, which is converted to electrical power by the generator 20 to which the shaft 890 is mechanically coupled.

Figure 13:
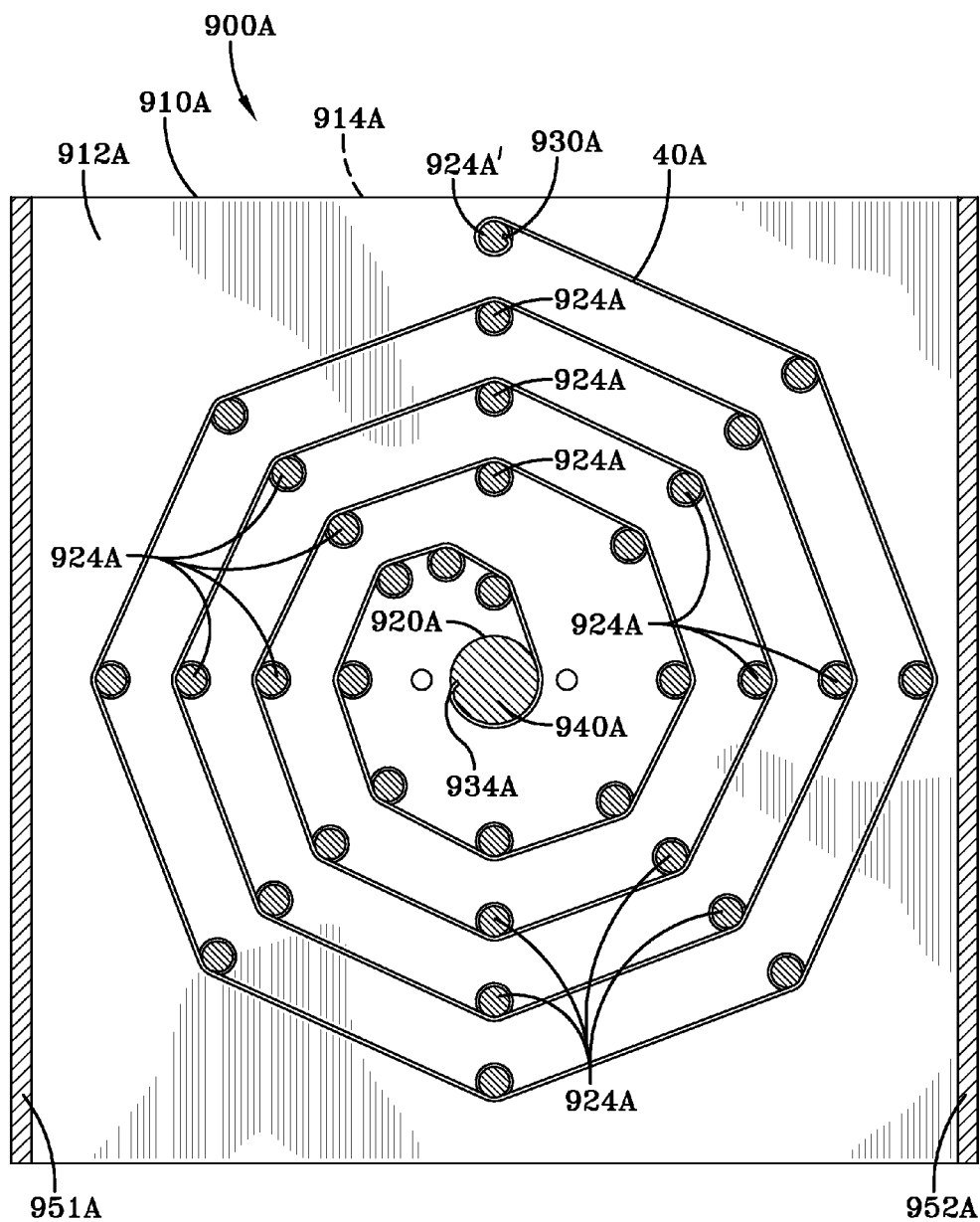
FIG. 13 is a cross-sectional view of a support assembly provided by the thermal energy harvesting system in accordance with the concepts of the present invention.
Figure 14:
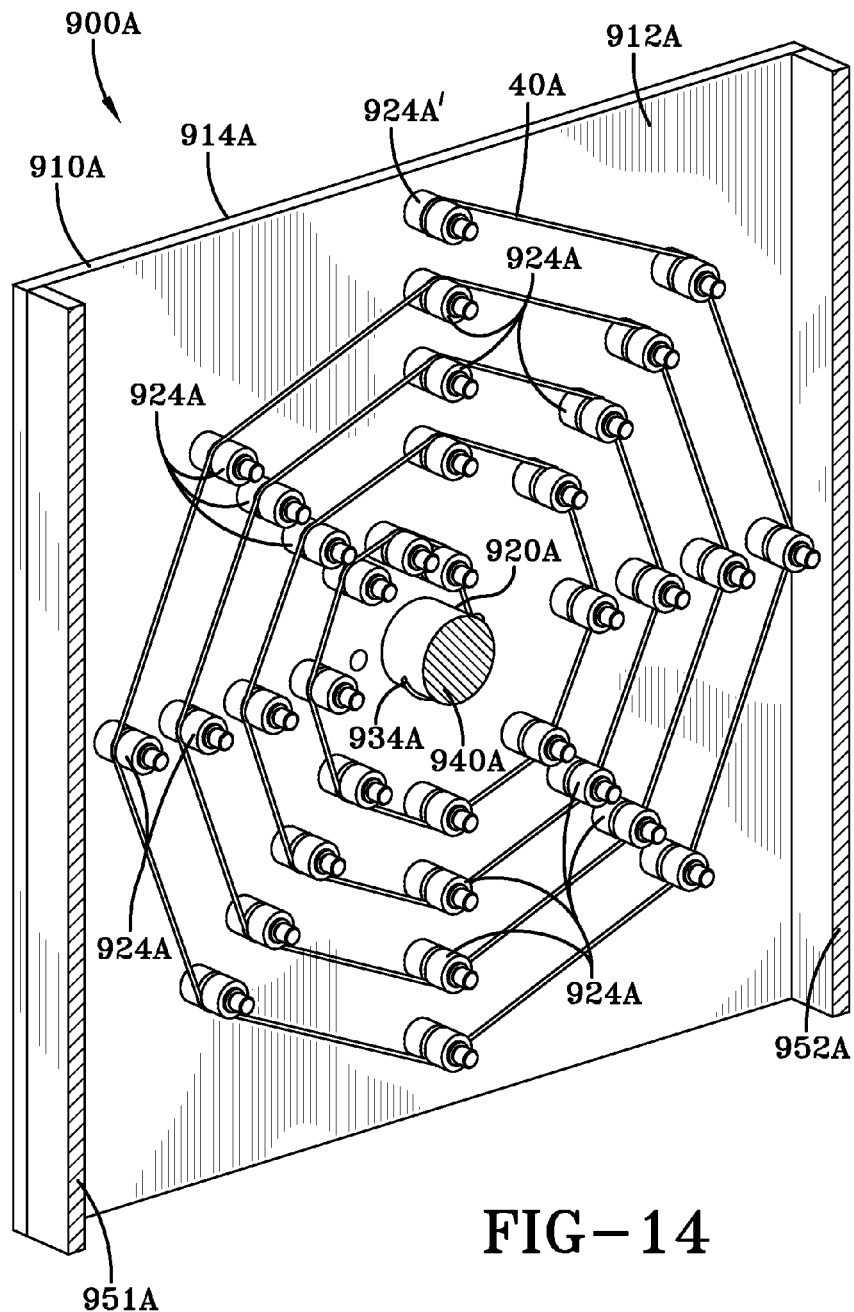
FIG. 14 is a perspective view of the support assembly provided by the thermal energy harvesting system in accordance with the concepts of the present invention.

Another embodiment of the thermal energy harvesting system, designated by the reference numeral 10'''' is shown in FIGS. 12-18 of the drawings. The thermal energy harvesting system 10'''' includes a pair of retention housings 900A-B that are configured to be carried within a vessel or any other suitable frame 904. However, because the housings 900A and 900B are structurally equivalent, only the components of housing 900A will be discussed below, such that the components associated with housing 900A will be identified by the identifier 'A' and the components associated with the housing 900B will be identified by the identifier 'B'. Specifically, as shown in FIGS. 13-14, the housing 900A includes a substantially planar base section 910A that includes an opposed inner surface 912A and outer surface 914A. Disposed through the base 910A is a centrally located aperture 920A. Extending from the inner surface 912A of the base 910A at a substantially right angle is a plurality of protrusions 924A. The protrusions 924A are positioned in a radial orientation from the central aperture 920A so that the shape memory section 40A carried by the protrusions is held in a helical arrangement or shape. In one aspect, the protrusions may rotate via bearings or the like.

Figure 15:
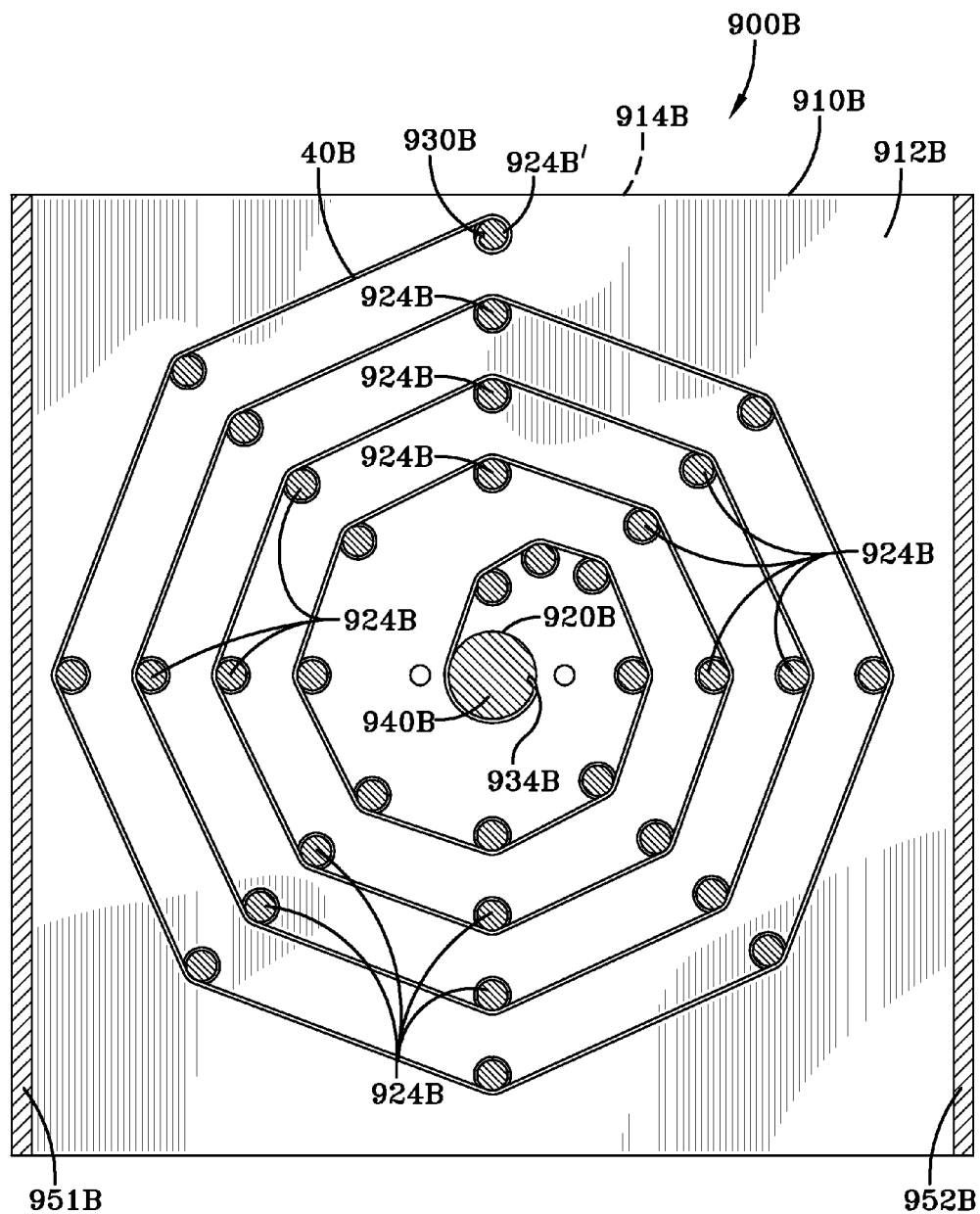
FIG. 15 is a cross-sectional view of another support assembly provided by the thermal energy harvesting system in accordance with the concepts of the present invention.

Specifically, the shape memory sections 40A-B are retained by protrusions 924A-B, which are provided by respective housing 900A, shown in FIG. 13, and housing 900B, shown in FIG. 15, that serve to ensure that the shape memory sections 40A-B take on a helical or coiled orientation or shape. In particular, the shape memory section 40A has one end 930A that is attached to the protrusion that is furthest from the central aperture 920A, whereby such protrusion is designated by the reference numeral 924A'. However, it should be appreciated that the end 930A of the shape memory section 40A may be coupled to any one of the protrusions 924A. In addition, the other end 934A of the shape memory section 40A is attached to a shaft 940A that is rotatably received within the central aperture 920A. Memory shape section 40B is carried by the housing 900B in an equivalent manner.

Figure 16:
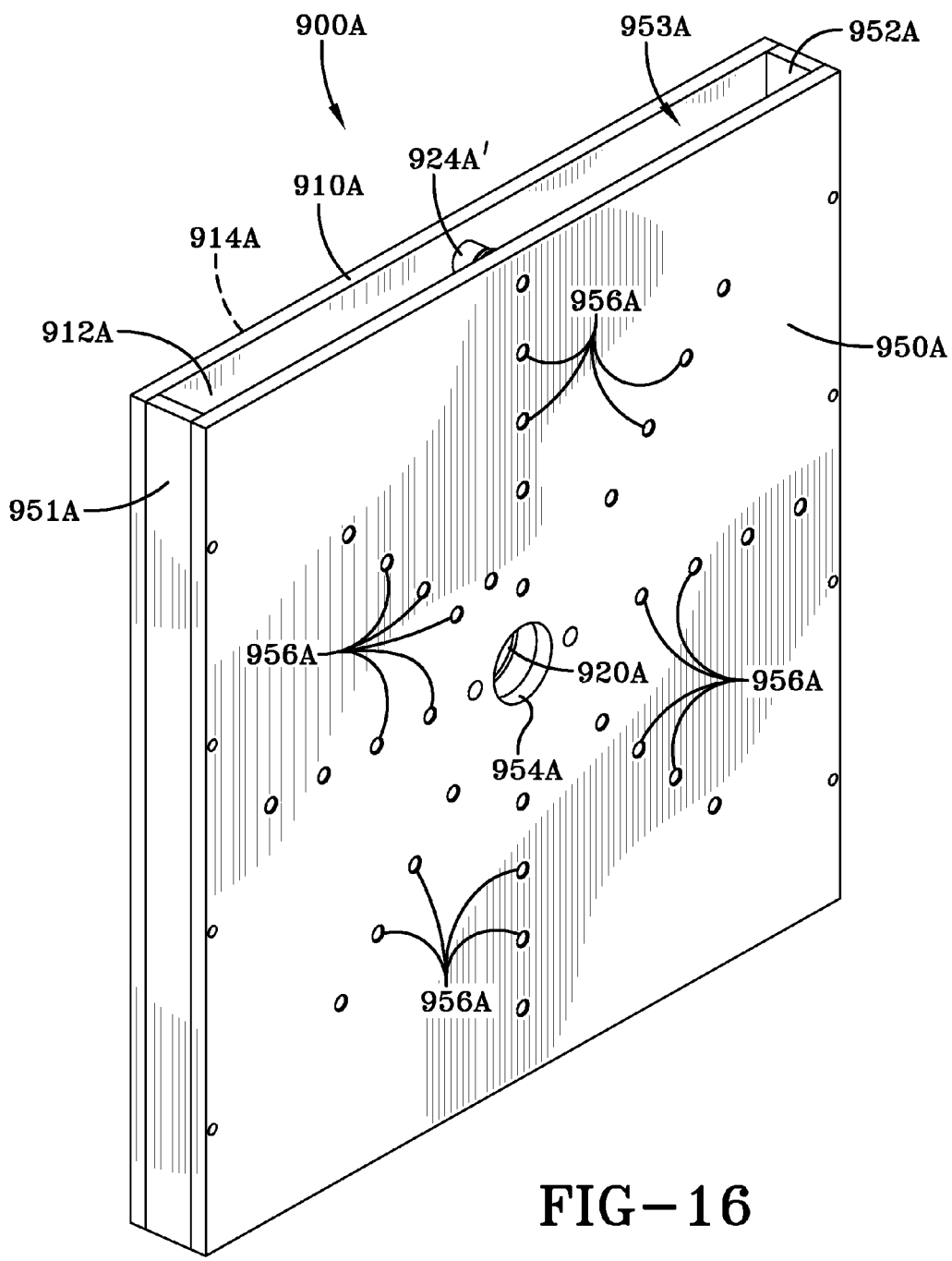
FIG. 16 is another perspective view of the support assembly provided by the thermal energy harvesting system in accordance with the concepts of the present invention.

The housing 900A also includes a cover section 950A, shown in FIG. 16, which is spaced from the base section 910A by spaced lateral walls 951A and 952A, thus forming a cavity 953A within the housing 900A. Specifically the cover section 950A is disposed over and attached to the base section 910A so that the shape memory section 40A is not able to be released (i.e. fall off) from any of the protrusions 924A, ensuring that the shape memory section 40A maintains its helical shape that is defined by the protrusions 924A during the operation of the system 10''''. It should be appreciated that the cover section 950A may be attached to the base section 910A using any suitable means of fixation, including screws or adhesive for example. In particular, the cover section 950A includes a central aperture 954A that is substantially aligned with the central aperture 920A of the base section 910A. As such, the shaft 940A is rotatably received within the central aperture 920A of the base section 910A and the central aperture 954A of the cover section 950A. Furthermore, the cover section 950A may include retention apertures 956A that are configured to receive an end of the protrusions 924A. Finally, because the cover section 950A is spaced from the base section 910A by the lateral sections 951A and 952A, upper and lower apertures 957A and 958A of the housing 900A open into the cavity 953A.

Thus, because one end 930A of the shape memory section 40A is anchored to a fixed position at the protrusion 924A', while the other end of the shape memory section 40A is attached to the rotating shaft 940A, the shape memory section 40A is able to rotate the shaft 940A as the length of the shape memory section 40A contracts when it is heated. Thus, by utilizing housings 900A and 900B in an antagonistic manner, whereby when the memory shape section 40A is contracted in length the memory shape section 40B is expanded in length, and vice versa allows the shafts 940A-B to be rotated in an oscillating manner to supply mechanical force to the power generator 20 to generate electrical power.

Furthermore, because the shape memory sections 40A-B are wound within the housings 900A-D by the protrusions 924A in a helical or spiral manner the length of the shape memory sections 40A-B can be made relatively long. In particular, the length of the shape memory sections 40A-B can be selected to take on any desired length, so long as a suitable number of protrusions 924A-B are utilized to maintain the helical or spiral arrangement of the shape memory section 40A-B within the housing 900A-B.

Figure 17:
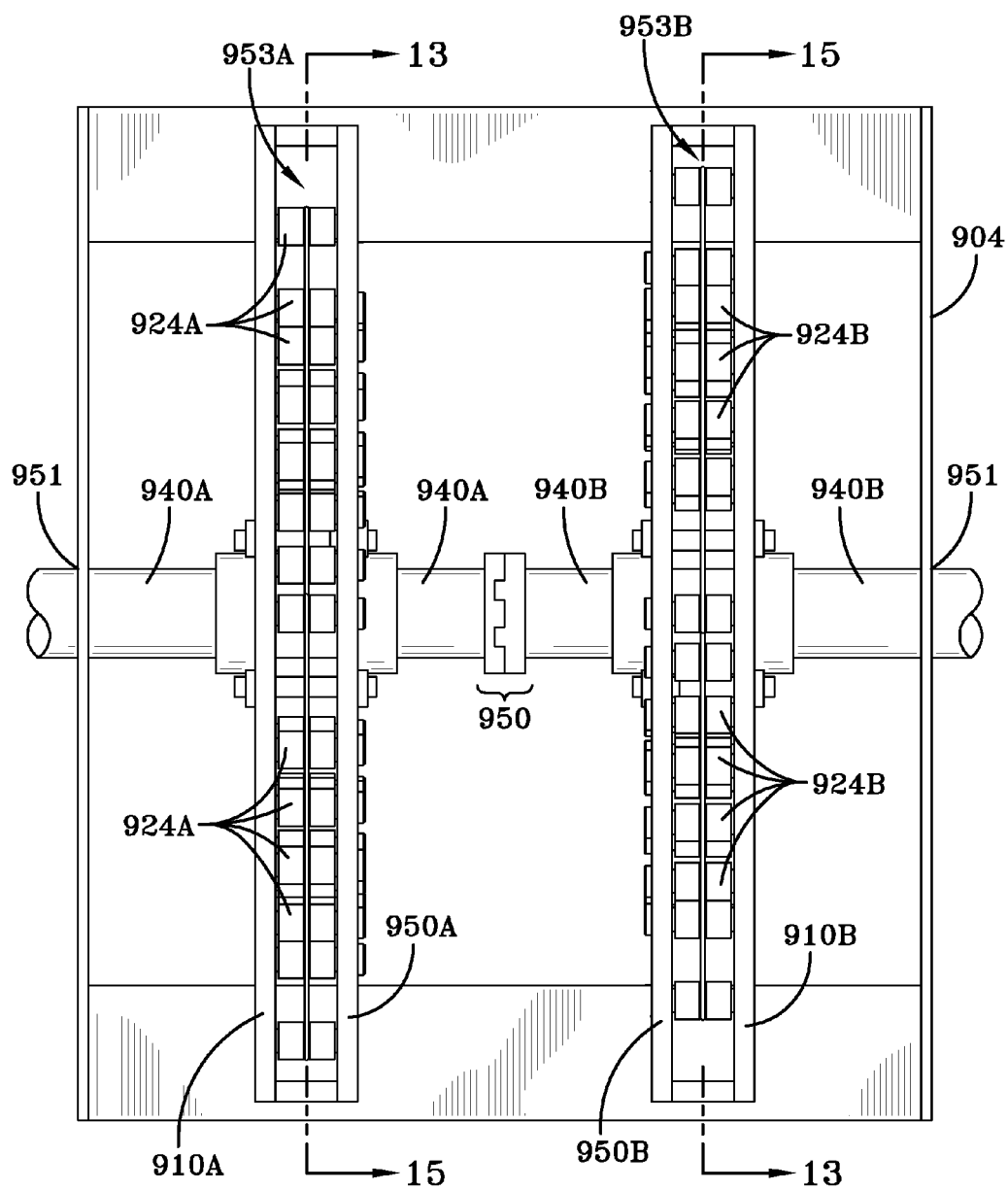
FIG. 17 is a top plan view of the thermal energy harvesting system in accordance with the concepts of the present invention.
Figure 18:
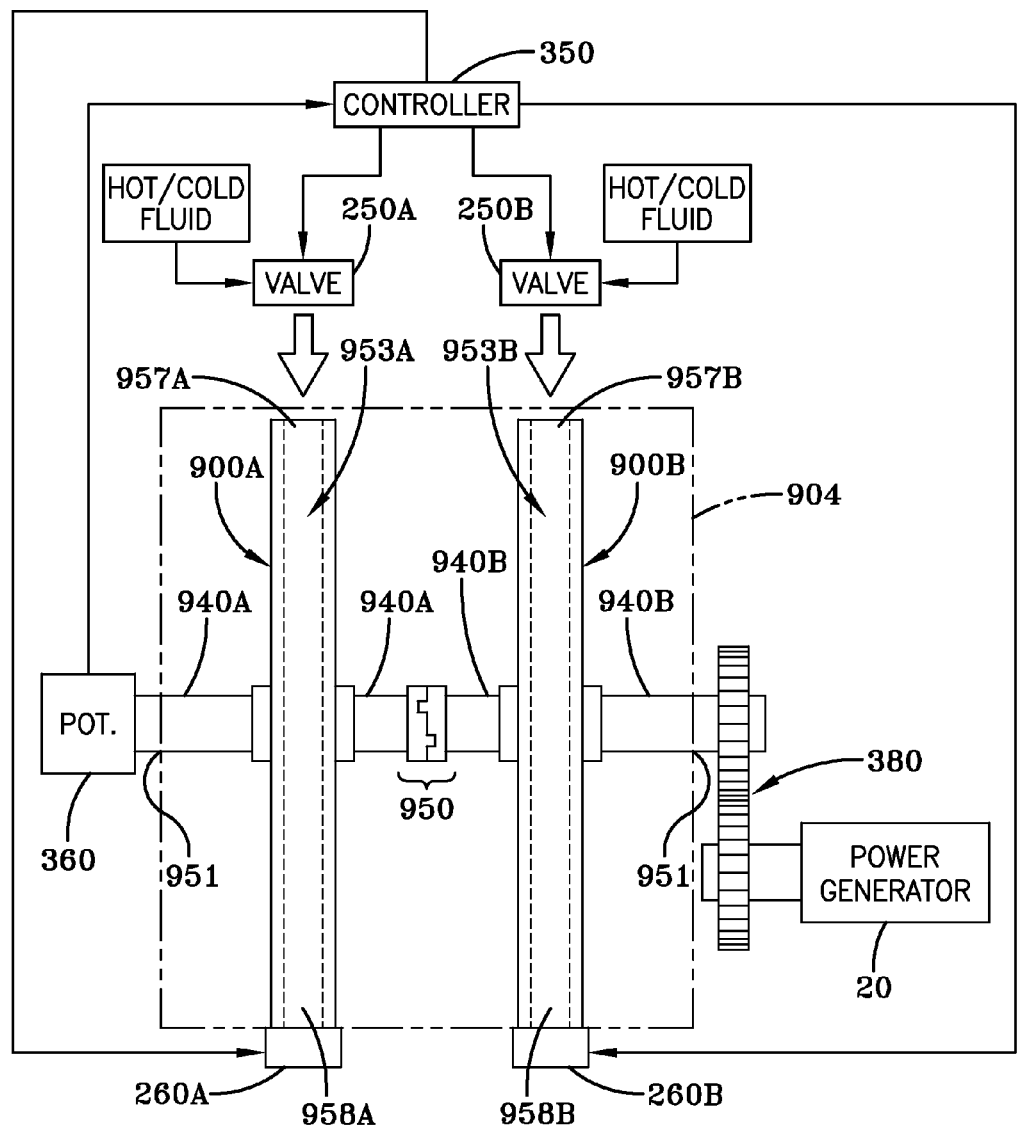
FIG. 18 is a schematic view of the thermal energy harvesting system in accordance with the concepts of the present invention.

To place the thermal energy harvesting system 10'''' into operation, the housings 900A and 900B are placed within the vessel 904, as shown in FIGS. 17 and 18. Once installed into the vessel 904, the shafts 940A and 940B that are provided by each of the housings 900A and 900B are coupled together via a coupling mechanism 950. However, it should be appreciated that the shafts 940A and 940B may be replaced with a single shaft that is received through each of the housings 900A and 900B. In addition, the vessel 904 also includes apertures 951 that permit each of the shafts 940A-B to extend therethrough, as shown in FIGS.

In order to supply hot and cold fluid into the housings 900A-B, inlet valves 250A-B are in fluid communication with respective upper apertures 957A-B, as shown in FIG. 18. Furthermore, to control the flow of fluid out of the vessel 904, drain valves 260A and 260B are in fluid communication with respective lower apertures 958A-B. The potentiometer 360 is also coupled to the shaft 940 to monitor its rotation during the operation of the system 10''''. As such, the controller 350 monitors the rotation of the shaft 940 in order to control the fluid inlet valves 250A-B and drain valves 260A-B, as previously discussed with regard to the system 10. Specifically, during a first cycle, the shaft 940 is rotated in one direction when the shape memory section 40A of housing 900A is contracted lengthwise upon the receipt of hot fluid within the cavity 953A, and the shape memory section 40B of housing 900B is expanded lengthwise upon the receipt of cold fluid within the cavity 953B. Once a predetermined amount of rotation(s) of the shaft 940 is detected by potentiometer 360, the controller 350 drains the fluid from the housings 900A-B via drain valves 260A-B. Next, a second cycle is initiated, whereby the inlet valves 250A-B are controlled so that the shape memory section 40A expands lengthwise upon the receipt of cold fluid with the cavity 953A, and the shape memory section 40B is contracted lengthwise upon the receipt of hot fluid within the cavity 953B. This results in the rotation of the shaft 940 in the opposite direction. Again, when the potentiometer 360 identifies that a predetermined amount of rotation(s) has been completed, the drain valves 260A-B are actuated to allow the first cycle to begin. Accordingly, the first and second cycles are repeated continuously, whereby the oscillating, back and forth rotation of the shaft 940 is converted by the power generator 20 into electrical power.

As such, the energy harvesting systems 10, 10', 10''', and 10'''' discussed herein utilize the expansion and contraction properties of the shape memory sections 40A-B to generate mechanical movement from low-grade heat sources, which can then be converted into electrical power. It should also be appreciated that in addition to the use of fluid to heat and cool the shape memory sections 40A-B any other medium, such as heated air (i.e. steam) and cooled air may be used to achieve the necessary expansion and contraction of the shape memory sections 40A-B needed to rotate the shaft 30 utilizing the embodiments discussed herein.

Therefore, one advantage of the present invention is that a thermal energy harvesting system enables the generation of electrical power using low-grade heat sources. Still another advantage of the present invention is that the thermal energy harvesting system is compact in size.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A thermal energy harvesting system comprising:
a frame to rotatably carry a shaft adapted to be coupled to a power generator;
a first elongated tube having a first shape memory section at least partially enclosed therein, said first shape memory section having one end attached to, and coiled around, said shaft and a second end adapted to be attached to a first fixed point;
a second elongated tube having a second shape memory section at least partially enclosed therein, said second shape memory section having one end attached to, and coiled around, said shaft and a second end adapted to be attached to a second fixed point;
a first inlet valve in fluid communication with said first tube to control the flow of a first temperature fluid and a second temperature fluid into said first tube, wherein the temperature of said first temperature fluid is greater than the temperature of said second temperature fluid;
a second inlet valve in fluid communication with said second tube to control the flow of said first temperature fluid and said second temperature fluid into said second tube; and
a controller coupled to said first and second inlet valves to control the flow of said first temperature fluid and said second temperature fluid through said first and second inlet valves;
wherein the energy harvesting system is configured such that said first shape memory section contracts lengthwise and said second shape memory section expands lengthwise to rotate said shaft in a first direction when said first tube receives said first temperature fluid and said second tube receives said second temperature fluid, and said first shape memory section expands lengthwise and said second shape memory section contracts lengthwise to rotate said shaft in an opposite direction when said first tube receives said second temperature fluid and said second tube receives said first temperature fluid.

2. The thermal energy harvesting system of claim 1 further comprising:
a first drain valve in fluid communication with said first tube, said first drain valve coupled to said controller;
a second drain valve in fluid communication with said second tube, said second drain valve coupled to said controller;
wherein said controller actuates said first and second drain valves before each said first and second tube is filled with fluid.

3. The thermal energy harvesting system of claim 2, further comprising:
a potentiometer in mechanical communication with said shaft to detect the amount of rotation of said shaft, said potentiometer coupled to said controller;
wherein said controller controls said first and second inlet valves and said first and second drain valves based on the amount of rotation detected.

4. The thermal energy harvesting system of claim 1, wherein said first fixed point is attached to said first tube, and said second fixed point is attached to said second tube.

5. The thermal energy harvesting system of claim 1, wherein said first fixed point is external to said first elongated tube, and said second fixed point is external to said second elongated tube.

6. The thermal energy harvesting system of claim 1, wherein said first and second temperature fluids comprise water.

7. The thermal energy harvesting system of claim 1, wherein said first and second tubes are closed at one end that is proximate to said respective first and second fixed points.

* * * * *